United States Patent
Tayebi et al.

(10) Patent No.: US 11,643,942 B2
(45) Date of Patent: May 9, 2023

(54) TURBINE SYSTEM WITH PARTICULATE PRESENCE AND ACCUMULATION MODEL FOR PARTICULATE INGRESS DETECTION

(71) Applicant: GENERAL ELECTRIC COMPANY, Schenectady, NY (US)

(72) Inventors: Kamel Abdelkader Tayebi, Khobar (SA); Murali Krishna Kalaga, Salmiya (KW); Abdurrahman Abdallah Khalidi, Dubai (AE); Maruthi Manohar Jupudi, Dubai (AE); Sumith Unniyattil, Khobar (SA); Rebecca Evelyn Hefner, Fountain Inn, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/387,910

(22) Filed: Jul. 28, 2021

(65) Prior Publication Data
US 2023/0029650 A1  Feb. 2, 2023

(51) Int. Cl.
*F01D 21/00* (2006.01)
*F01D 21/14* (2006.01)
(Continued)

(52) U.S. Cl.
CPC ........... *F01D 21/003* (2013.01); *F01D 21/14* (2013.01); *F02C 7/05* (2013.01); *G01M 15/14* (2013.01);
(Continued)

(58) Field of Classification Search
CPC ........ F01D 21/003; F01D 21/14; F01D 25/32; F02C 7/05; G01M 15/14; F05D 2260/607;
(Continued)

(56) References Cited

U.S. PATENT DOCUMENTS 6,254,341 B1    7/2001  Ackerman et al.
7,527,674 B1 *  5/2009  Janawitz ................ B03C 3/363
                                               96/57
(Continued)

FOREIGN PATENT DOCUMENTS

CN    113176191    7/2021
EP      3643904    4/2020
(Continued)

OTHER PUBLICATIONS

Extended European Search Report dated Jan. 3, 2023 from corresponding European Application No. 22184518.3.
(Continued)

*Primary Examiner* — Topaz L. Elliott
(74) *Attorney, Agent, or Firm* — Grogan, Tuccillo & Vanderleeden, LLP

(57) ABSTRACT

A control system for turbine systems configured to utilize an intelligent model of particulate presence and accumulation within turbine systems to address engine maintenance, erosion, corrosion, and parts failure mitigation is disclosed. The control system may build an intelligent model of fluid flow based on the data value measured by at least one sensor and based on a database of known data values to provide an estimation of amount of ingress of air intake particles into the turbine system, fouling within the turbine system, erosion of at least a portion of the turbine system, and performance degradation rate of the turbine system.

23 Claims, 20 Drawing Sheets

(51) Int. Cl.
*F02C 7/05* (2006.01)
*G01M 15/14* (2006.01)
*F01D 25/32* (2006.01)

(52) U.S. Cl.
CPC ........ *F01D 25/32* (2013.01); *F05D 2260/607* (2013.01); *F05D 2260/80* (2013.01); *F05D 2260/81* (2013.01); *F05D 2270/3062* (2013.01)

(58) Field of Classification Search
CPC ............. F05D 2260/80; F05D 2260/81; F05D 2270/3062; B01D 35/14; B01D 35/143; B01D 35/1435; B01D 46/442; G01N 2015/0662
See application file for complete search history.

(56) References Cited

U.S. PATENT DOCUMENTS

| | | | |
|---|---|---|---|
| 7,689,368 B2 | 3/2010 | Douglas | |
| 7,871,237 B2* | 1/2011 | Bunce | G01N 15/02 |
| | | | 702/182 |
| 8,414,676 B2 | 4/2013 | Hiner et al. | |
| 8,475,115 B2 | 7/2013 | Zhang et al. | |
| 9,280,797 B2 | 3/2016 | Ekanayake et al. | |
| 9,556,798 B2 | 1/2017 | Ekanayake et al. | |
| 9,557,246 B2 | 1/2017 | Ekanayake et al. | |
| 9,644,484 B2 | 5/2017 | Ekanayake et al. | |
| 9,718,012 B2 | 8/2017 | Chung et al. | |
| 9,739,168 B2 | 8/2017 | Ekanayake et al. | |
| 9,897,582 B2 | 2/2018 | Jean et al. | |
| 10,220,353 B2 | 3/2019 | Taylor | |
| 10,272,475 B2 | 4/2019 | Scipio et al. | |
| 10,724,398 B2* | 7/2020 | Zhang | F02C 7/055 |
| 10,780,385 B2* | 9/2020 | Kippel | G01B 7/16 |
| 11,125,168 B2* | 9/2021 | Hanlon | F04D 27/001 |
| 2008/0016971 A1* | 1/2008 | Bunce | G01N 15/02 |
| | | | 73/114.74 |
| 2009/0229468 A1* | 9/2009 | Janawitz | F02C 7/052 |
| | | | 415/121.2 |
| 2010/0288034 A1 | 11/2010 | Agrawal et al. | |
| 2014/0123621 A1 | 5/2014 | Driessens et al. | |
| 2017/0298286 A1 | 10/2017 | Nowak et al. | |
| 2017/0312673 A1 | 11/2017 | Smith et al. | |
| 2018/0032000 A1 | 2/2018 | Shinkawa et al. | |
| 2018/0068498 A1 | 3/2018 | Hodge | |
| 2018/0073386 A1 | 3/2018 | Zhang et al. | |
| 2018/0073389 A1* | 3/2018 | Zhang | F01D 21/003 |
| 2018/0230907 A1 | 8/2018 | Ewens et al. | |
| 2019/0160404 A1 | 5/2019 | Smithies | |
| 2019/0224596 A1* | 7/2019 | Kariveti | B01D 35/1435 |
| 2019/0226401 A1 | 7/2019 | Heeter et al. | |
| 2020/0073348 A1* | 3/2020 | Weber | B01D 46/0032 |
| 2020/0131996 A1* | 4/2020 | Hanlon | F02C 6/08 |
| 2020/0271561 A1* | 8/2020 | Lavrovsky | B01D 35/1435 |
| 2021/0231053 A1* | 7/2021 | Mohr | B01D 46/62 |

FOREIGN PATENT DOCUMENTS

| | | | |
|---|---|---|---|
| EP | 3643905 | 4/2020 | |
| WO | WO-9624760 A1 * | 8/1996 | ............ B01D 50/00 |
| WO | WO-2022023253 A1 * | 2/2022 | |
| WO | WO-2022023256 A1 * | 2/2022 | |

OTHER PUBLICATIONS

European Search Report dated Dec. 15, 2022 from corresponding European Application No. 22184512.6.

* cited by examiner

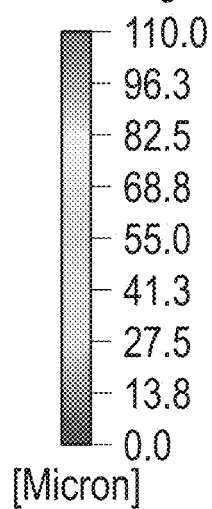
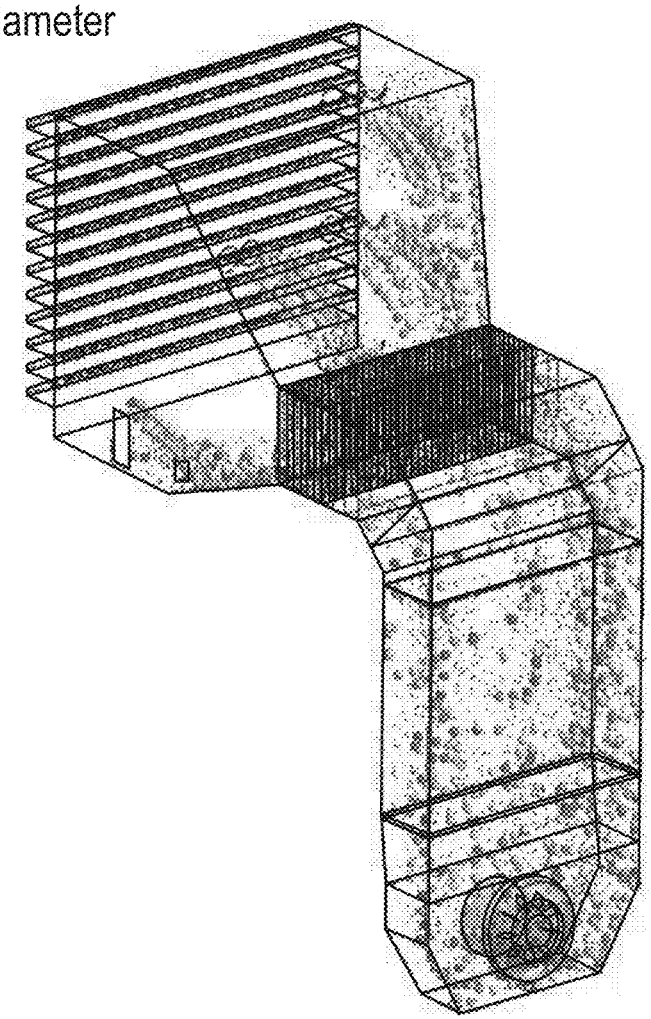
FIG. 8A

Regional Particulate Distribution/Concentration Study

| Ambient Condition | Size (microns) | Radius (microns) | Particle volume (m3) | Dust Particle based on sand density of 2002.3 kg/m3 | | | | Liquid particle with 39.5 PSU and sea water density of 1039.5 kg/m3 (PSU=39.5g salt/1kg water) | | | | New distribution | Output of the filtration (F9 as per EN779:2002) | |
|---|---|---|---|---|---|---|---|---|---|---|---|---|---|---|
| | | | | Mass(Kg) | Equivalent mass | % by count | # of particles per m3 of air | Mass | % by count | Equivalent mass | # of particles per m3 of air | % by count | Dust particles # of particles per m3 of air | Liquid particles # of particles per m3 of air |
| Desert Condition (368 ug/m3) | 5 to 10 | 3.75 | 2.21E-16 | 4.42E-13 | 4.12E-16 | 0.1 | 69898 | 0 | 0 | 0 | 0 | 0.0 | 0 | 0 |
| | 2 to 5 | 3.5 | 1.80E-16 | 3.60E-13 | 1.67E-15 | 0.5 | 349492 | 0 | 0 | 0 | 0 | 0.0 | 0 | 0 |
| | 1.5 to 2 | 1.75 | 2.24E-17 | 4.50E-14 | 1.85E-15 | 4.1 | 3097371 | 0 | 0 | 0 | 0 | 0.1 | 7703 | 0 |
| | 1 to 1.5 | 1.25 | 8.18E-18 | 1.64E-14 | 5.45E-16 | 3.3 | 2498866 | 0 | 0 | 0 | 0 | 0.3 | 25676 | 0 |
| | 0.5 to 1 | 0.75 | 1.77E-18 | 3.54E-15 | 3.07E-16 | 8.7 | 6513633 | 0 | 0 | 0 | 0 | 3.2 | 241350 | 0 |
| | 0 to 0.5 | 0.25 | 6.54E-20 | 1.31E-16 | 1.09E-16 | 83.3 | 62545926 | 0 | 0 | 0 | 0 | 96.3 | 7235793 | 0 |
| | Total | | | | 4.90E-15 | 100 | 75075208 | | | | | 100 | 7507521 | 0 |
| Desert Coastal proximity > 1 km (176 ug/m3, out of which 151 ug/m3 are solid and 25 ug/m3 are liquid aerosols) | 5 to 10 | 3.75 | 2.21E-16 | 4.42E-13 | 4.12E-16 | 0.1 | 28681 | 0 | 0 | 0 | 0 | 0.0 | 0 | 0 |
| | 2 to 5 | 3.5 | 1.80E-16 | 3.60E-13 | 1.67E-15 | 0.5 | 143406 | 0 | 0 | 0 | 0 | 0.0 | 0 | 0 |
| | 1.5 to 2 | 1.75 | 2.24E-17 | 4.50E-14 | 1.85E-15 | 4.1 | 1270932 | 0 | 0 | 0 | 0 | 0.1 | 3161 | 0 |
| | 1 to 1.5 | 1.25 | 8.18E-18 | 1.64E-14 | 5.45E-16 | 3.3 | 1025350 | 0 | 0 | 0 | 0 | 0.3 | 10535 | 0 |
| | 0.5 to 1 | 0.75 | 1.77E-18 | 3.54E-15 | 3.07E-16 | 8.7 | 2672722 | 0 | 0 | 0 | 0 | 3.2 | 99032 | 0 |
| | 0 to 0.5 | 0.25 | 6.54E-20 | 1.31E-16 | 1.09E-16 | 83.3 | 25664225 | 0 | 0 | 0 | 0 | 96.3 | 2967804 | 0 |
| | 7.25 | 3.625 | 2.00E-16 | | | | | 2.07E-13 | 0.15 | 3.11E-16 | 22668 | 0 | 0 | 0 |
| | 5.75 | 2.875 | 9.95E-17 | | | | | 1.03E-13 | 0.25 | 2.59E-16 | 31180 | 0 | 0 | 0 |
| | 4.25 | 2.125 | 4.02E-17 | | | | | 4.18E-14 | 0.5 | 2.09E-16 | 75560 | 0 | 0 | 0 |
| | 3 | 1.5 | 1.41E-17 | | | | | 1.47E-14 | 1.5 | 2.20E-16 | 226680 | 0 | 0 | 0 |
| | 2 | 1 | 4.19E-18 | | | | | 4.35E-15 | 7.1 | 3.09E-16 | 1072952 | 0 | 0 | 0 |
| | 1.3 | 0.65 | 1.15E-18 | | | | | 1.20E-15 | 13 | 1.55E-16 | 1964561 | 14.4 | 0 | 217079 |
| | 1 | 0.5 | 5.24E-19 | | | | | 5.44E-16 | 15 | 8.16E-17 | 2266804 | 16.6 | 0 | 250475 |
| | 0.8 | 0.4 | 2.68E-19 | | | | | 2.79E-16 | 22 | 6.13E-17 | 3324641 | 24.3 | 0 | 367364 |
| | 0.6 | 0.3 | 1.13E-19 | | | | | 1.18E-16 | 40.5 | 4.76E-17 | 6120362 | 44.8 | 0 | 676283 |
| | Total | | | | 4.90E-15 | 100 | 30805316 | | 100 | 1.65E-15 | 15112004 | 100 | 3085532 | 1511200 |
| Desert+ Coastal proximity < 1 km (161 ug/m3, out of which 101 ug/m3 are solid and 50 ug/m3 are liquid aerosols) | 5 to 10 | 3.75 | 2.21E-16 | 4.42E-13 | 4.12E-16 | 0.1 | 19184 | 0 | 0 | 0 | 0 | 0.0 | 0 | 0 |
| | 2 to 5 | 3.5 | 1.80E-16 | 3.60E-13 | 1.67E-15 | 0.5 | 95920 | 0 | 0 | 0 | 0 | 0.0 | 0 | 0 |
| | 1.5 to 2 | 1.75 | 2.24E-17 | 4.50E-14 | 1.85E-15 | 4.1 | 850094 | 0 | 0 | 0 | 0 | 0.1 | 2323 | 0 |
| | 1 to 1.5 | 1.25 | 8.18E-18 | 1.64E-14 | 5.45E-16 | 3.3 | 685830 | 0 | 0 | 0 | 0 | 0.3 | 7745 | 0 |
| | 0.5 to 1 | 0.75 | 1.77E-18 | 3.54E-15 | 3.07E-16 | 8.7 | 1787715 | 0 | 0 | 0 | 0 | 3.2 | 72798 | 0 |
| | 0 to 0.5 | 0.25 | 6.54E-20 | 1.31E-16 | 1.09E-16 | 83.3 | 17166137 | 0 | 0 | 0 | 0 | 96.3 | 2181630 | 0 |
| | 7.25 | 3.625 | 2.00E-16 | | | | | 2.27E-13 | 0.15 | 3.11E-16 | 45336 | 0 | 0 | 0 |
| | 5.75 | 2.875 | 9.95E-17 | | | | | 1.03E-13 | 0.25 | 2.59E-16 | 75560 | 0 | 0 | 0 |
| | 4.25 | 2.125 | 4.02E-17 | | | | | 4.18E-14 | 0.5 | 2.09E-16 | 151120 | 0 | 0 | 0 |
| | 3 | 1.5 | 1.41E-17 | | | | | 1.47E-14 | 1.5 | 2.20E-16 | 453360 | 0 | 0 | 0 |
| | 2 | 1 | 4.19E-18 | | | | | 4.35E-15 | 7.1 | 3.09E-16 | 2145905 | 0 | 0 | 0 |
| | 1.3 | 0.65 | 1.15E-18 | | | | | 1.20E-15 | 13 | 1.55E-16 | 3929121 | 14.4 | 0 | 434157 |
| | 1 | 0.5 | 5.24E-19 | | | | | 5.44E-16 | 15 | 8.16E-17 | 4533601 | 16.6 | 0 | 500950 |
| | 0.8 | 0.4 | 2.68E-19 | | | | | 2.79E-16 | 22 | 6.13E-17 | 6649282 | 24.3 | 0 | 734727 |
| | 0.6 | 0.3 | 1.13E-19 | | | | | 1.18E-16 | 40.5 | 4.76E-17 | 12240723 | 44.8 | 0 | 1352566 |
| | Total | | | | 4.90E-15 | 100 | 20604880 | | 100 | 1.65E-15 | 30224009 | 100 | 2264497 | 3022401 |

FIG. 9

| Sl # | Run | Conditions |
|---|---|---|
| 1 | Run1 | Simulating small particle ingress with no breaches in filters and duct flange joint breaches at FSFL condition (Send suspension in air -Normal) |
| 2 | Run2 | Simulating filter and duct flange joint breaches at FSFL condition (Sand suspension in air -Normal) |
| 3 | Run3 | Simulating filter and duct flange joint breaches at FSFL condition (Sand suspension in air -Sand storm, Evap ON -Compressor flow Max |

TURBINE SYSTEM WITH PARTICULATE PRESENCE AND ACCUMULATION MODEL FOR PARTICULATE INGRESS DETECTION

BACKGROUND

The disclosure relates generally to sensing systems and methods for turbine systems, and more particularly, to sensing systems and methods configured to utilize an intelligent model of particulate presence and accumulation within gas turbine systems to address engine maintenance, erosion, corrosion, and parts failure mitigation.

Gas turbines are used throughout the world in many diverse applications and environments. This diversity creates a number of challenges to the air filtration system, necessitating a different solution for each type of environmental contaminant(s), gas turbine platform technology, and/or fuel quality. For example, gas turbines which operate in hot and harsh climates or operating environments in which the gas turbine system is exposed to severe air quality contaminations, and/or high efficiency gas turbines operating at high operational temperatures, face significant challenges on the engine performance, reliability, and/or maintainability where there is a compromise or breach in the inlet system of the gas turbine system. Different operating environments for gas turbines having substantially different structures cannot adequately protect gas turbine systems from contaminants with a common air filtration monitoring system. When conventional filtration systems fail, and sand and other undesirable particles enter the gas turbine, the components of the gas turbine may become damaged and/or inoperable. Additionally, undesirably particles flowing through components of the gas turbine may reduce the operational efficiency of the gas turbine itself.

To prevent debris and/or particles from entering the gas turbine, the filtration systems typically include multiple stages of filtration components that filter various sizes of debris and/or particles prior to the working fluid (e.g., filtered air) entering the compressor of the gas turbine. However, these components included in conventional filtration systems can become damaged by the same debris and may no longer filter out the debris and particles as desired. Additionally, or alternatively, the components included in conventional filtration systems may not operate as desired (e.g., filter out debris) due to improper installation, extended operation-life or use, improper maintenance, unusual high load of contaminants, and/or other degradation factors.

In conventional systems, there is no customized warning or indication system that such filtration components are damaged and/or inoperable for gas turbines having different structures and located in different operating environments. In hot and harsh operating environments in particular, the degradation and component failure risk increase dramatically. As such, turbine engine systems having different structures and/or operating in hot and harsh environments demand more forced outage hours and increased costs in addition to more frequent wash cycles and/or maintenance.

BRIEF DESCRIPTION

A first aspect of the disclosure provides a method of determining the optimal location to place particle detection sensors ("PDS" including electrostatic sensors) in a fluid flow path of a turbine system. The method includes: consulting an intelligent model of fluid flow tailored to the turbine system and based on a database of known data values; determining one or more locations within the fluid flow path that will allow particle detection and measurement of an accurate data value of an air intake particle charged by an electrostatic component within the fluid flow path; placing a sensor at the one or more locations within the fluid flow path; and measuring at least one measured data value of the air intake particle at the at least one location of the sensor. The database of known data values includes a structure of the turbine system, a structure of the fluid flow path, the location of the sensor, other known fluid flow data, testing data, contaminant information, and/or field observations. The at least one location within the fluid flow path minimizes the likelihood of accumulation of air intake particles on the electrostatic sensor.

A second aspect of the disclosure provides a control system including an intelligent model for a turbine system. The intelligent model includes: at least one measured data value received from at least one sensor, the sensor positioned within a fluid flow path of the turbine system within an air inlet system of the turbine system; and a database of known data including a structure of the turbine system, a structure of fluid flow paths in the turbine system, a location of the sensor, other known fluid flow data, testing data, contaminant data, and/or field observations. The control system consults the intelligent model to provide an estimation of possible breach of the air inlet system, amount of ingress of air intake particles into the turbine system, fouling within the turbine system, erosion of at least a portion of the turbine system, and/or performance degradation rate of the turbine system.

A third aspect of the disclosure provides a control system including an intelligent model for a turbine system. The intelligent model includes: at least one measured data value received from at least one sensor, the sensor positioned within a fluid flow path of the turbine system; and a database of known data including at least one of a structure of the turbine system, a structure of fluid flow paths in the turbine system, a location of the sensor, other known fluid flow data, testing data, and field observations. The control system consults the intelligent model to provide an estimation of possible breach of the air inlet system, amount of ingress of air intake particles into the turbine system, fouling within the turbine system, erosion of at least a portion of the turbine system, and/or performance degradation rate of the turbine system. The control system generates a signal to alert the turbine operator and/or to control one or more operating parameters of the turbine system.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIGS. 8A-8C show a computer-generated diagram of sand particle tracks from a weather hood to a compressor inlet of a turbine system, according to another embodiment of the disclosure;

FIG. 9 is a table depicting experimental data of the particles of the turbine systems of FIGS. 6A-8C, according to embodiments of the disclosure;

FIGS. 14A and 14B show the results of computational fluid dynamics analysis of turbine systems, according to embodiments of the disclosure.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
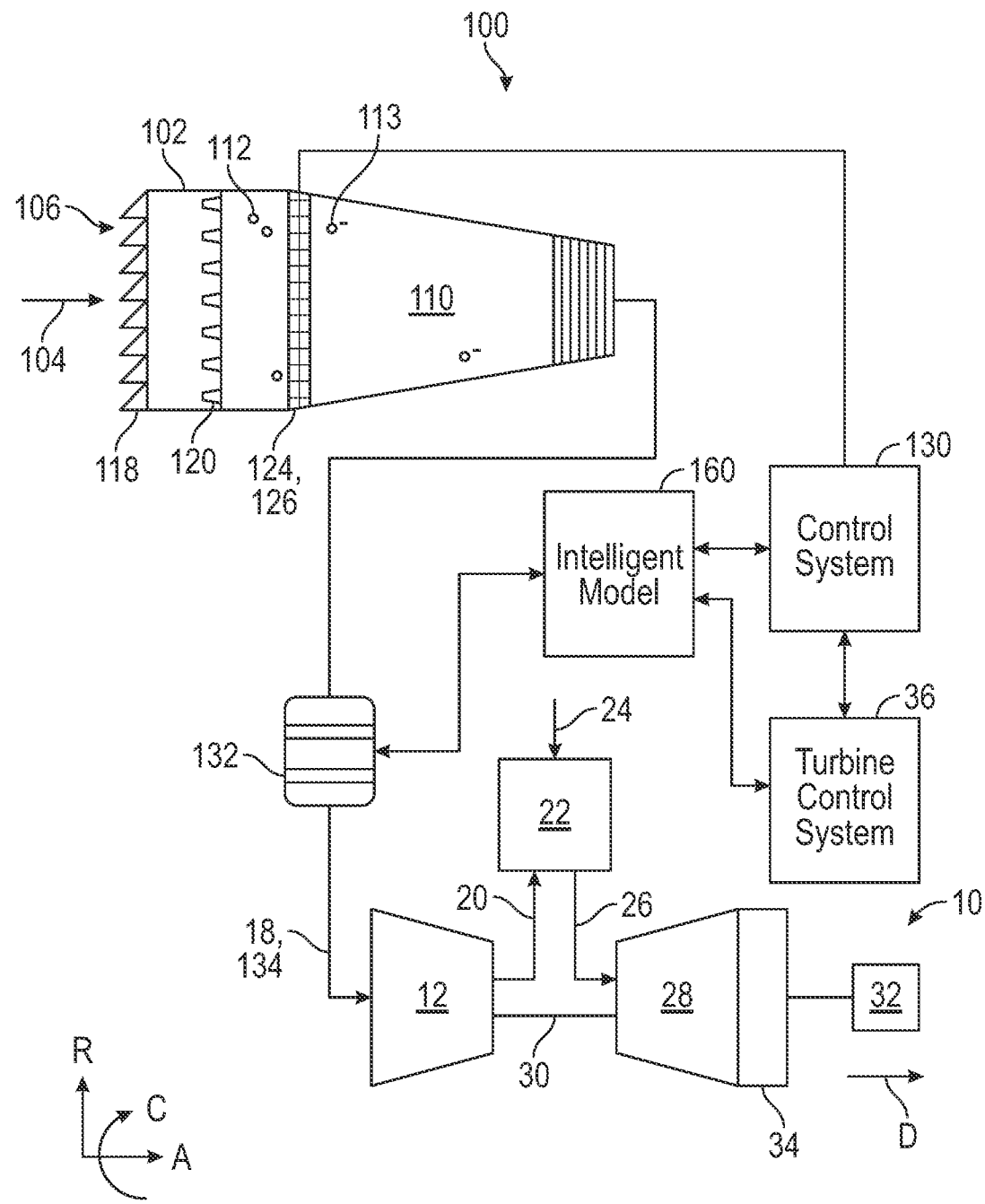
FIG. 1 shows a schematic view of a turbine system and an air filtration assembly including an intelligent model, according to embodiments of the disclosure.

As an initial matter, in order to clearly describe the current disclosure it will become necessary to select certain terminology when referring to and describing relevant machine components within the scope of this disclosure. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine. Additionally, the terms "leading" and "trailing" may be used and/or understood as being similar in description as the terms "forward" and "aft," respectively. It is often required to describe parts that are at differing radial, axial and/or circumferential positions. The "A" axis represents an axial orientation. As used herein, the terms "axial" and/or "axially" refer to the relative position/direction of objects along axis A, which is substantially parallel with the axis of rotation of the turbine system (in particular, the rotor section). As further used herein, the terms "radial" and/or "radially" refer to the relative position/direction of objects along a direction "R" (see, FIG. 1), which is substantially perpendicular with axis A and intersects axis A at only one location. Finally, the term "circumferential" refers to movement or position around axis A (e.g., direction "C").

As indicated above, the disclosure relates generally to sensing systems and methods for turbine systems, and more particularly, to sensing systems and methods configured to utilize an intelligent model of particulate presence and accumulation within turbine systems to provide more accurate detection of particles and/or improve turbine system operation by specifically tailoring the control of the turbine systems to the structure of the turbine systems and/or the operating environments. The intelligent model utilizes equations and algorithms to arrive at accurate and specifically-tailored analysis of particle accumulation and the effects of the accumulation on the operation and/or efficiency of the turbine systems. The intelligent model may update in real time, iterating the results and recommendations based on data measurements taken in quick succession.

Reference will be made below in detail to exemplary embodiments of the invention, examples of which are illustrated in the accompanying drawings. Wherever possible, the same reference characters used throughout the drawings refer to the same or like parts. While embodiments of the invention are directed to a system and method for inhibiting particulate and foreign object ingress in gas/combustion turbine systems, embodiments of the invention are not so limited in this regard and are applicable to a variety of systems including, for example, aero/marine, hydrogen/ammonia, etc. based turbine applications and, still further, embodiments of the present invention may be applicable to other fields/systems/processes in which an apparatus is subjected to environmental conditions and/or repetitive stresses that may detrimentally affect apparatus health/longevity.

These and other embodiments are discussed below with reference to FIGS. 1-15. However, those skilled in the art will readily appreciate that the detailed description given herein with respect to these Figures is for explanatory purposes only and should not be construed as limiting.

FIG. 1 shows a schematic view of an illustrative turbine system, e.g., gas turbine system 10, that is configured for use with an embodiment of the invention. Gas turbine system 10 may include a compressor 12 and an air filtration assembly 100 positioned upstream of and in fluid communication with compressor 12. Compressor 12 compresses an incoming flow of filtered air 18 that may be filtered by and flow from air filtration assembly 100 to compressor 12 into a compressed air 20 and ultimately to a combustor 22. Combustor 22 mixes the flow of compressed air 20 with a pressurized flow of fuel 24 and combusts the mixture to create a flow of combustion gases 26. Although only a single combustor 22 is shown, gas turbine system 10 may include any number of combustors 22. The flow of combustion gases 26 is in turn delivered to a turbine 28. The flow of combustion gases 26 drives turbine 28 to produce mechanical work. The mechanical work produced in turbine 28 drives compressor 12 via a rotor 30 extending through turbine 28 and may be used to drive an external load 32, such as an electrical generator and/or the like.

Gas turbine system 10 may also include an exhaust fluid flow path terminating at an exhaust frame 34. As shown in FIG. 1, exhaust frame 34 may be positioned adjacent to turbine 28 of gas turbine system 10. More specifically, exhaust frame 34 may be positioned adjacent to turbine 28 and may be positioned substantially downstream of turbine 28 and/or the flow of combustion gases 26 flowing from combustor 22 to turbine 28.

Subsequent to combustion gases 26 flowing through and driving turbine 28, combustion gases 26 may be exhausted, flow-through and/or discharged through exhaust frame 34 in a flow direction (D). In the non-limiting example shown in FIG. 1, combustion gases 26 may flow through exhaust frame 38 in the flow direction (D) and may be discharged from gas turbine system 10 (e.g., to the atmosphere). In another non-limiting example (not shown) where gas turbine system 10 is part of a combined cycle power plant (e.g., including gas turbine system and a steam turbine system), combustion gases 26 may discharge from exhaust frame 34, and may flow in the flow direction (D) into a heat recovery steam generator of the combined cycle power plant.

As shown in FIG. 1, and discussed herein in detail, air filtration assembly 100 of gas turbine system 10 may include a plurality of components, devices, and/or systems that may detect when particles are in intake air that may form filtered air 18. Additionally, or alternatively, air filtration assembly 100 may include a plurality of components, devices, and/or systems that may improve filtration of particles and/or prevent particles from being present in filtered air 18, prior to filtered air 18 being delivered to compressor 12. As discussed herein, the detection of particles and/or improved filtration of particles using air filtration assembly 100 may reduce/prevent damage to the internal components of gas turbine system 10 which receive and/or utilize filtered air 18 during operation. Furthermore, the implementation of air filtration assembly 100 may maintain/improve operational efficiencies of gas turbine system 10 by reducing/eliminating the number of undesirable particles included in filtered air 18.

In embodiments, air filtration assembly 100 may also include a plurality of vane filters 118 that may filter large particles 112 from intake air 104 and an array of fabric filters 120 positioned downstream of the vane filters 118. The array of fabric filters 120 may be formed as any suitable filtering components and/or devices that may be configured to further filter particles 112 from intake air 104 flowing therethrough. That is, the array of fabric filters 120 may be configured to filter finer and/or smaller particulates included in intake air 104 that may not necessarily be filtered by the plurality of vane filters 118.

The non-limiting example of air filtration assembly 100 shown in FIG. 1 also includes components, devices, and/or systems that may detect undesirable particles 112 in intake air 104. More specifically, during operation of air filtration assembly 100 undesirable particles 112 included in intake air 104 may not be filtered by the plurality of vane filters 118 and/or the array of fabric filters 120. Particles 112 may not be filtered due to their size (e.g., neither filtered by vane filters 118 nor fabric filters 120), and/or due to faults or deficiencies in the plurality of vane filters 118 and/or the array of fabric filters 120. For example, and as shown in FIG. 1, particles 112 may pass through, not be filtered by, and/or may flow downstream of the array of fabric filters 120 due to particle size, filter tears, and/or holes formed in some of the fabric filters 120 or in other components of the assembly 100, improper installation of fabric filters 120, and/or per solving and recrystallization processes. The tears and/or holes may be formed in fabric filters 120 by debris (e.g., insects) that may flow past the plurality of vane filters 118, improper installation and/or care of fabric filters 120, manufacturing defects, and/or operational wear of fabric filters 120. As a result, particles 112 included in intake air 104 may not be filtered and/or collected by fabric filters 120 and may flow through the holes.

As discussed herein, detecting particles 112 within the air inlet duct(s) beyond the plurality of vane filters 118 and/or the array of fabric filters 120 may indicate that components of air filtration assembly 100 are not functioning properly, may have been breached, and/or may require maintenance (e.g., replacement of torn fabric filters). This in turn, may reduce/prevent damage to compressor 12, combustor 22, and/or turbine 28 by particles 112 during operation, and/or may maintain/improve operational efficiencies of gas turbine system 10 by reducing/eliminating the number of undesirable particles 112 included in filtered air 18.

As shown in FIG. 1, air filtration assembly 100 may include an electrostatic component 124 positioned in air inlet duct 102. More specifically, electrostatic component 124 may be positioned within internal cavity 110 of air inlet duct 102, downstream of the array of fabric filters 120. Electrostatic component 124 may be configured to charge particles 112 that pass through the plurality of vane filters 118 and/or the array of fabric filters 120, and in turn through and/or over electrostatic component 124. As discussed herein, charged particles 113 included in intake air 104 may allow for easier and/or improved detection of particles 113 before particles 113 reach compressor 12 of gas turbine system 10. The sensor(s) 132 discussed herein may detect naturally charged particles 113 without the presence of electrostatic component(s) 124 within the turbine system 10.

In a non-limiting example, control system 130 and turbine control system 36, may be formed or configured as single, stand-alone systems or computing devices that function separately, as discussed herein, and are in communication with one another.

Alternatively, controller 130 may be integrally formed within, in communication with and/or formed as a part of turbine control system 36. However embodied, control system 130 and turbine control system 36 may be formed of any suitable device and/or system that may be configured to obtain and process information relating to gas turbine system 10 and control the various components of gas turbine system 10 and air filtration assembly 100.

By way of non-limiting example, the control system controller 130 and/or turbine control system 36 may include at least one processor and a memory device. In embodiments, the control system 130/turbine control system 36 may be a dedicated process logic controller or a general-purpose computer such as a desktop/laptop and may include, and/or electronically communicate with, a database that stores data. The control system 130 and/or turbine control system 36 may be at the same site/location as the turbine system 10, or in embodiments, located at a different site and may electronically communicate with the turbine system 10 via a communication link, which may be wired and/or wireless.

Air filtration system 100 may also include at least one sensor 132 in the form of an electrostatic sensor. As shown in FIG. 1, sensor(s) 132 may be operably coupled to and/or in operable communication with control system 130. Sensor(s) 132 may be positioned downstream of filtration stages. Additionally, sensor(s) 132 may be positioned upstream of compressor 12. In the non-limiting example, sensor(s) 132 may also be positioned downstream of air inlet duct 102. In the non-limiting example, sensor(s) 132 may be in fluid communication and/or positioned within a conduit 134 fluidly coupling air filtration assembly 100 and compressor 12. That is, sensor(s) 132 may be in communication with conduit 134 that may deliver filtered air 18 to compressor 12.

Sensor(s) 132 may be formed from any suitable sensor and/or device that may be configured to detect the charged particles 113 of intake air 104 that may be previously charged by the matrix of ionizers 126 and flow past sensor(s) 132 (e.g., particulate matter sensor). In non-limiting examples, sensor(s) 132 may be formed as flush-mounted button sensors with high local resolution, multiple button system sensors arranged in a ring, circumferential ring sensors, and the like. Additionally, or alternatively, sensor(s) 132 may be staged in flow direction to increase the detectability of charged particles 113 dragged by the flow by correlating the signals of the different stages together with the flow speed known from the turbine control system 36.

It is understood that the location(s) and number of sensor(s) 132 shown in the embodiments is merely illustrative. That is, in the non-limiting example shown in FIG. 1, two sensors 132 are shown. Air filtration assembly 100 may include more or less sensor(s) 132 than those shown in the figures.

During operation of gas turbine system 10, intake air 104 may flow through air filtration assembly 100 to provide working fluid (e.g., filtered air 18) to compressor 12. Particles 112 included in intake air 104 may undesirably flow through filtering components (e.g., plurality of vane filters 118, the array of fabric filters 120) due to damage and/or defect in the same components.

As naturally charged particles 113 flow out of air filtration assembly 100 and are delivered to compressor 12 via conduit 134, charged particles 113 may be detected by sensor(s) 132. Sensor(s) 132 may detect ingested particles 113 and may provide information to control system 130 relating to contaminating particles 112, including, but not limiting to, the amount/concentration of particles 113. Using this information generated by sensor(s) 132, control system 130 may determine if the amount and/or the type of particles included in filtered air 18 being provided to compressor 12 may damage compressor 12 and/or reduce the operational efficiency of gas turbine system 10. In the non-limiting example where, for instance, the concentration and/or amount of charged particles 113 could or will damage compressor 12, combustor 22, and/or turbine 28, control system 130 may suggest or signal to turbine control system 36 that gas turbine system 10 should be shut down to prevent damage. The inclusion of air filtration assembly 100 with gas turbine system 10 allows for early detection of undesirable particles 112 flowing to compressor 12, which in turn may prevent or reduce damage to compressor 12 by allowing for immediate indication for repair, maintenance, and/or replacement of components of air filtration assembly 100.

Figure 2:
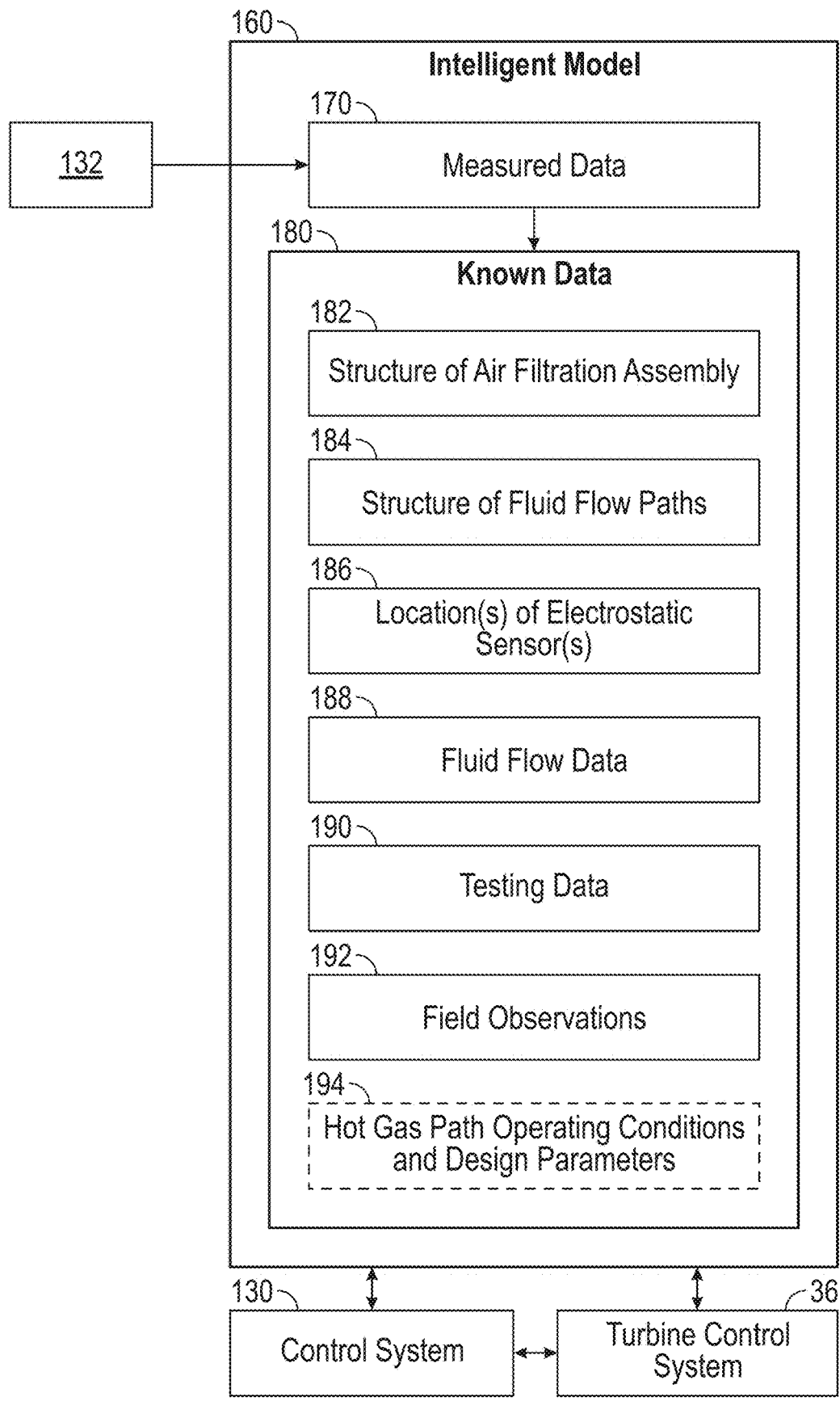
FIG. 2 shows a detailed view of the intelligent model of FIG. 1, according to embodiments of the disclosure.
Figure 3:
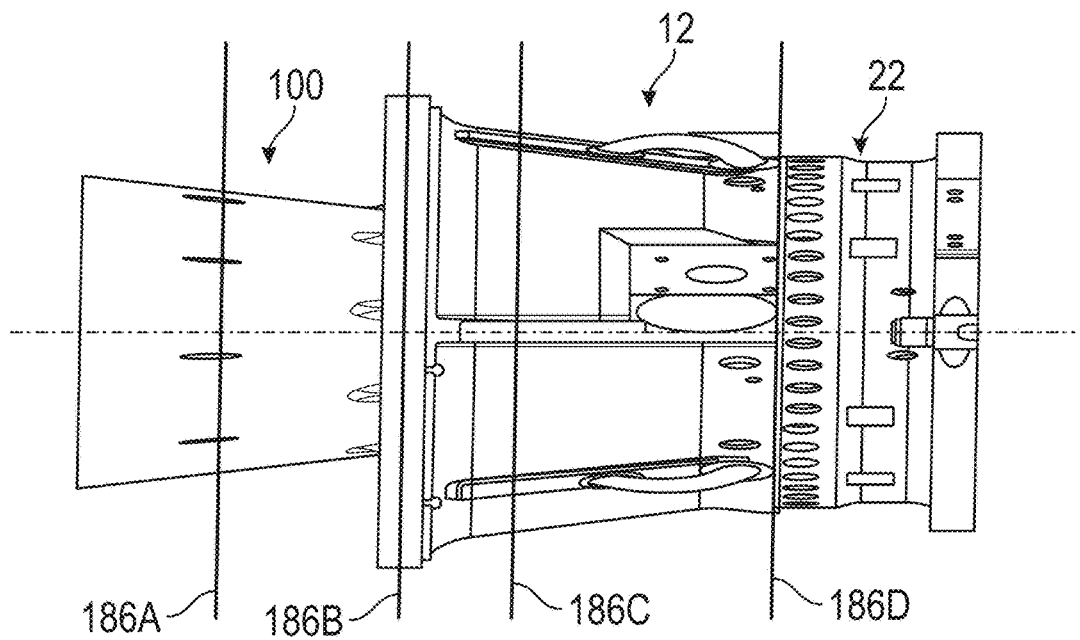
FIG. 3 shows a side view of a turbine system and an air filtration assembly, according to embodiments of the disclosure.
Figure 4A:
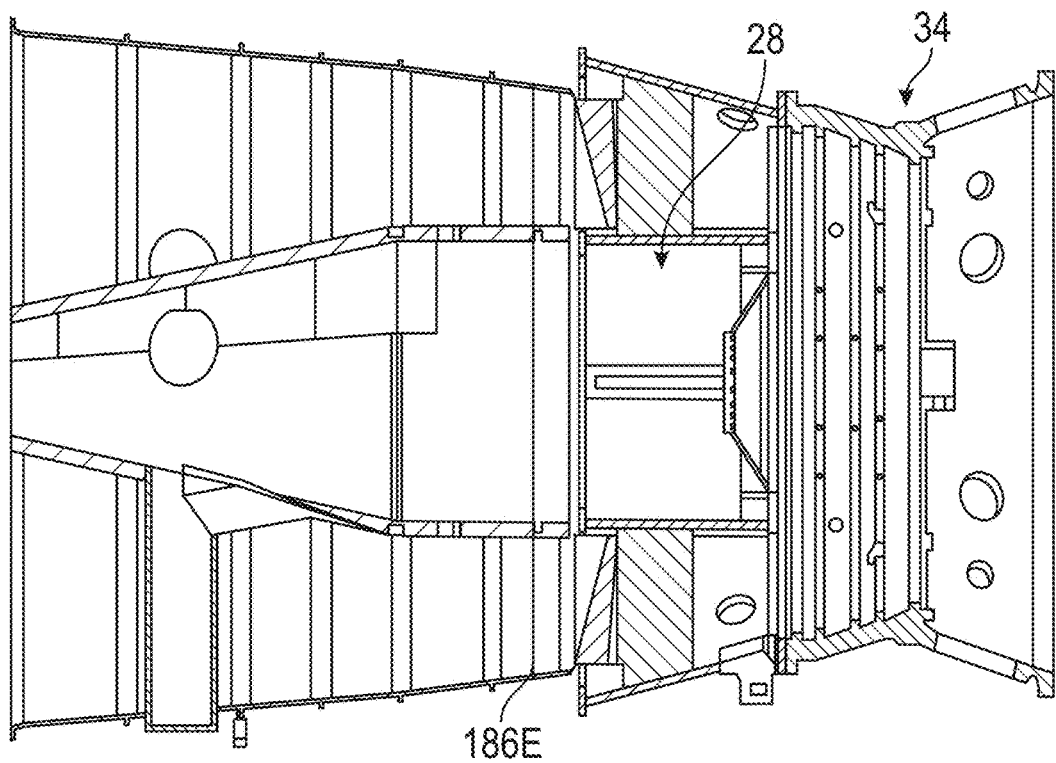
FIGS. 4A-4C show a front view, a side view, and an isometric view of an exhaust of a turbine system, according to embodiments of the disclosure.
Figure 4B:
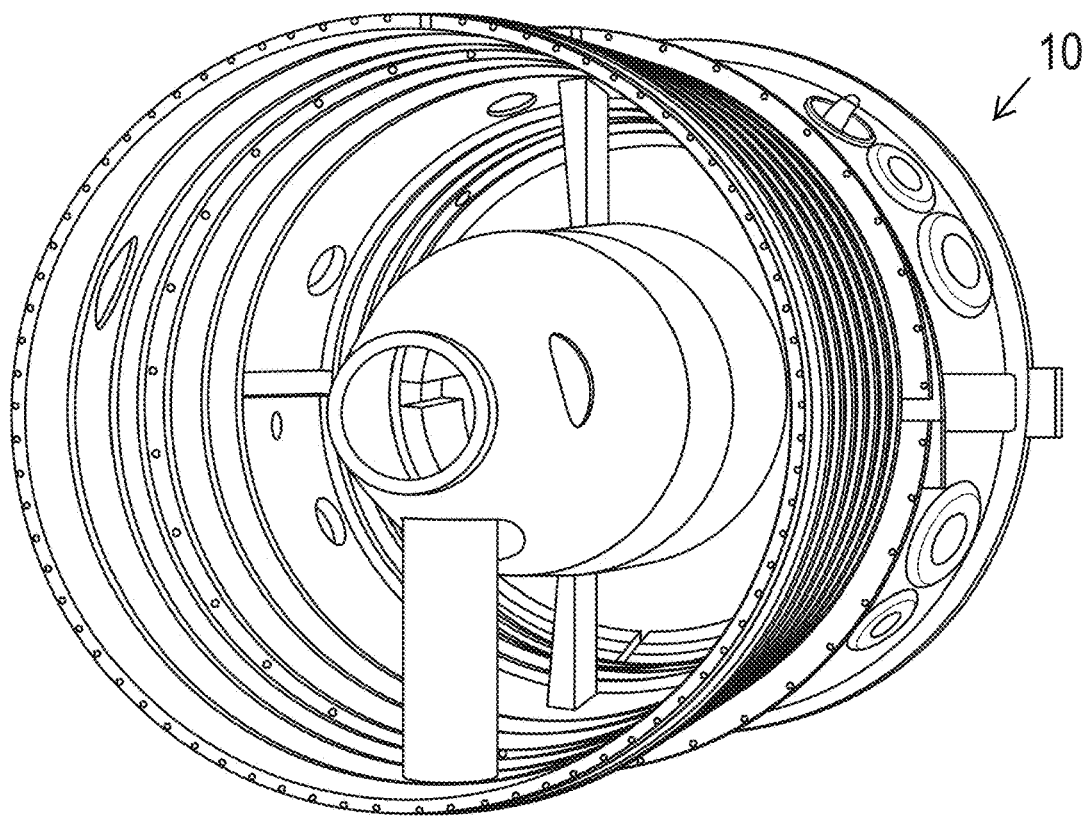
Figure 4C:
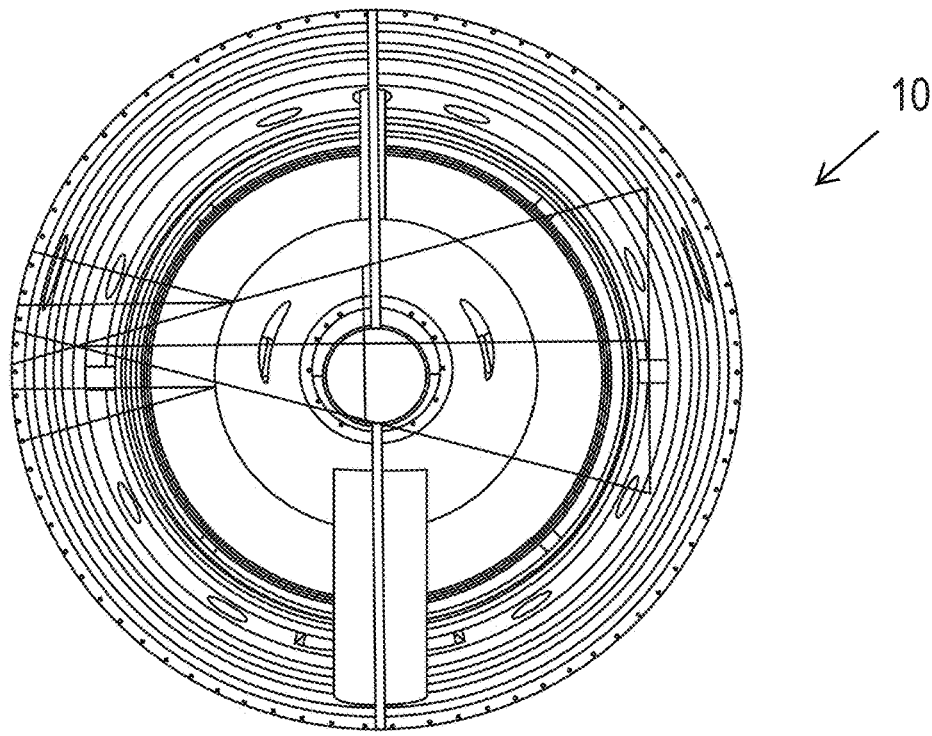
Figure 5A:
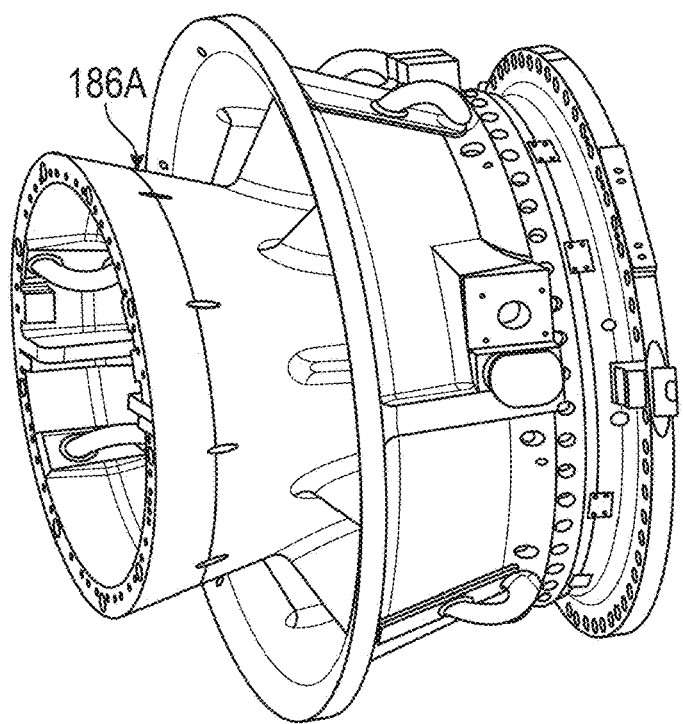
FIGS. 5A-5D depict the electromagnetic sensors of FIGS. 4A-4C in greater detail, according to embodiments of the disclosure.
Figure 5B:
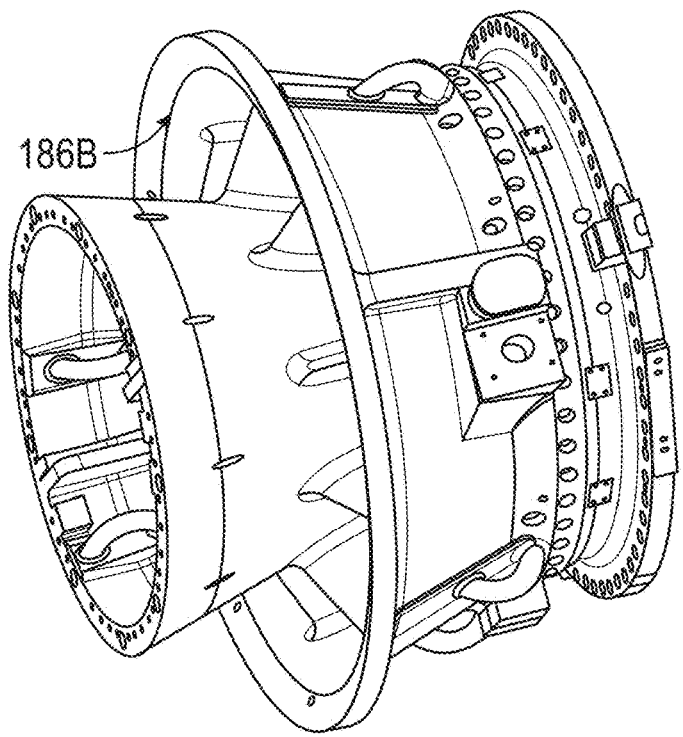
Figure 5C:
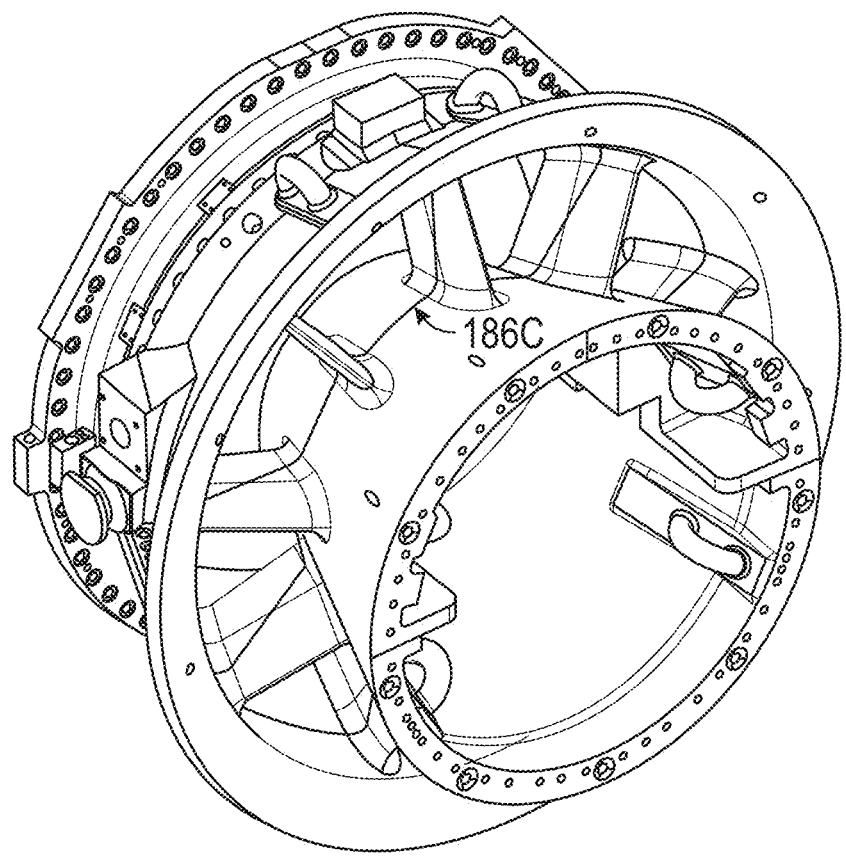
Figure 5D:
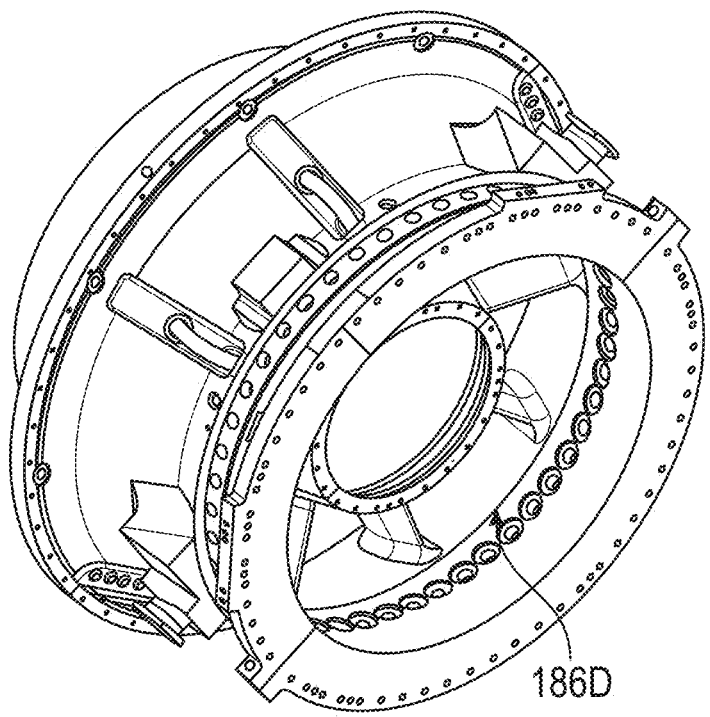
Figure 6A:
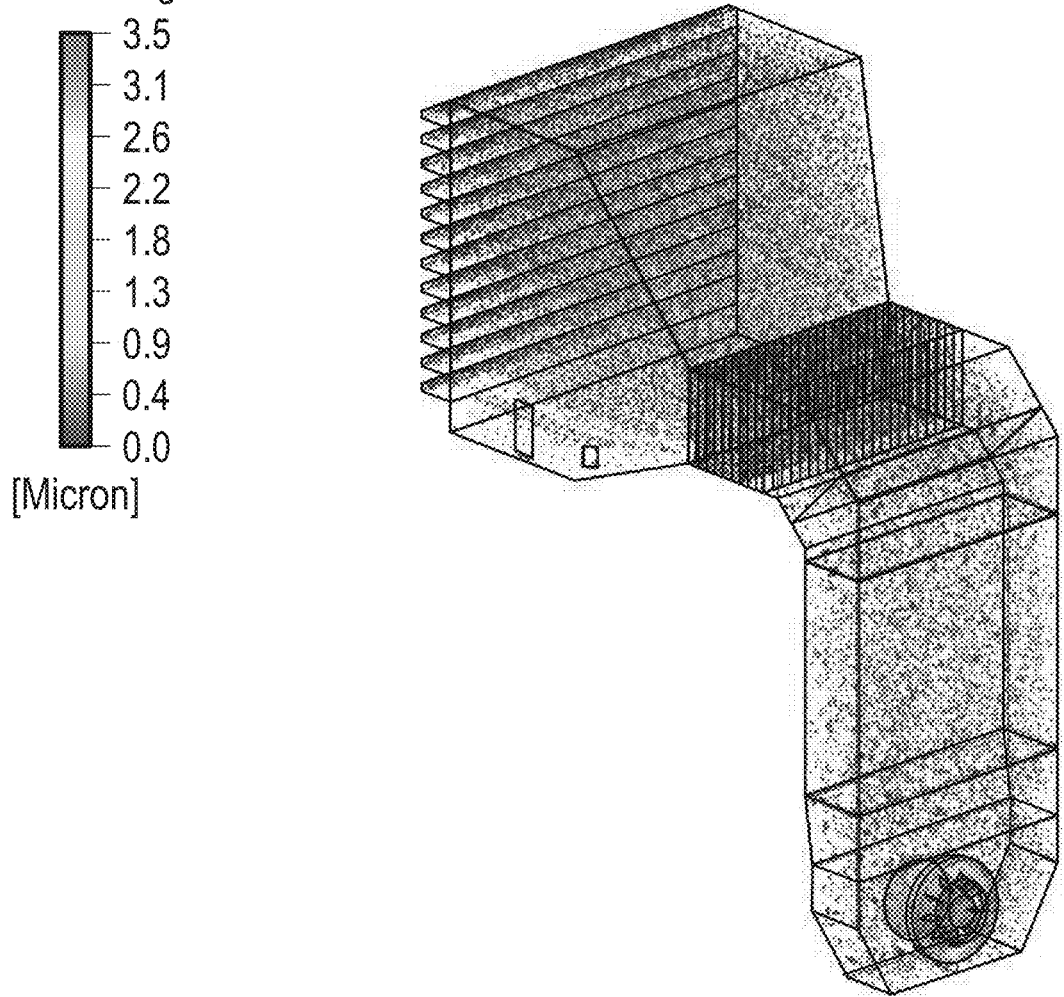
FIGS. 6A-6C show a computer-generated diagram of sand particle tracks from a weather hood to a compressor inlet of a turbine system, according to additional embodiments of the disclosure.
Figure 6B:
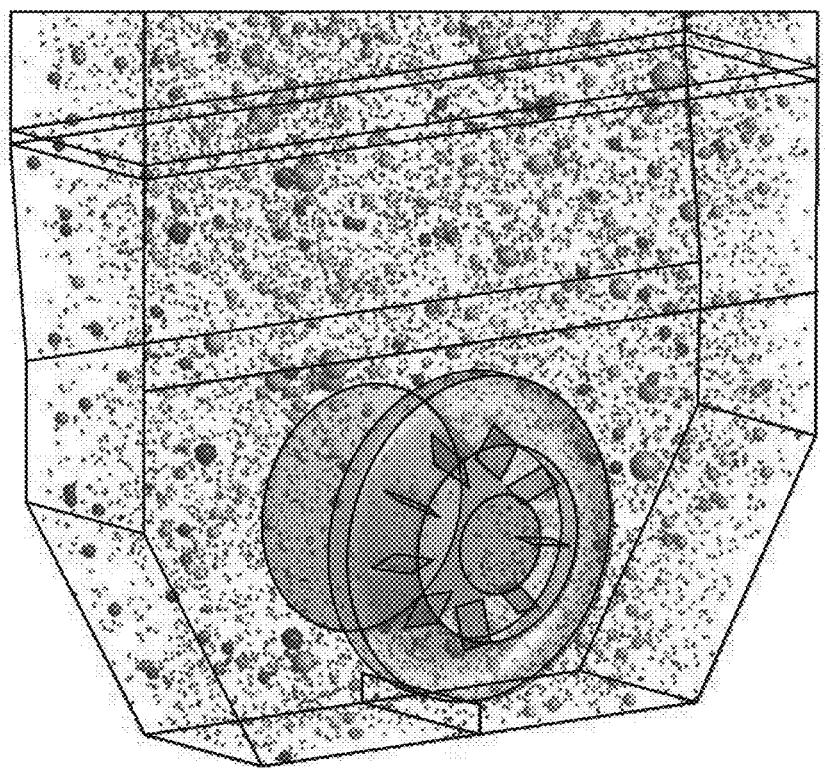
Figure 6C:
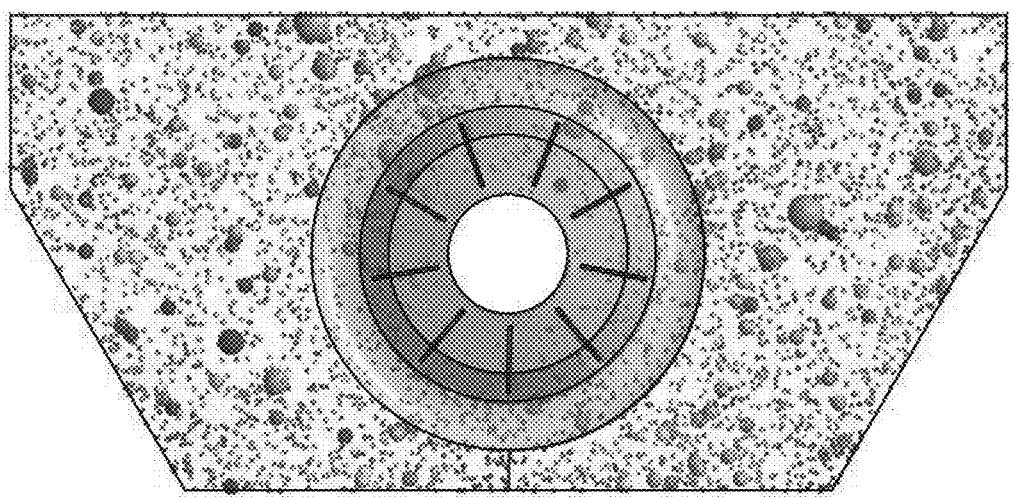
Figure 7A:
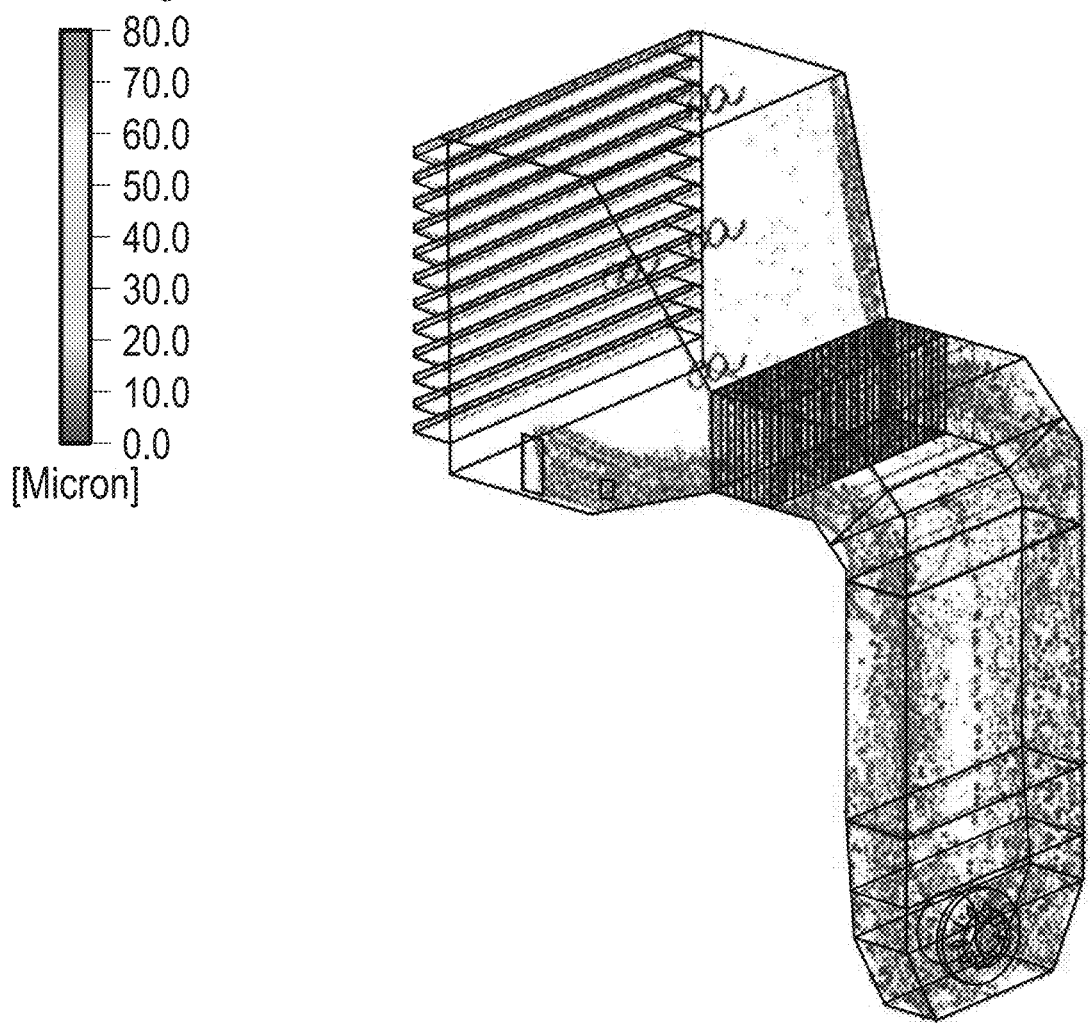
FIGS. 7A-7C show computer generated diagrams of sand particle tracks from a weather hood to a compressor inlet of a turbine system, according to further embodiments of the disclosure.
Figure 7B:
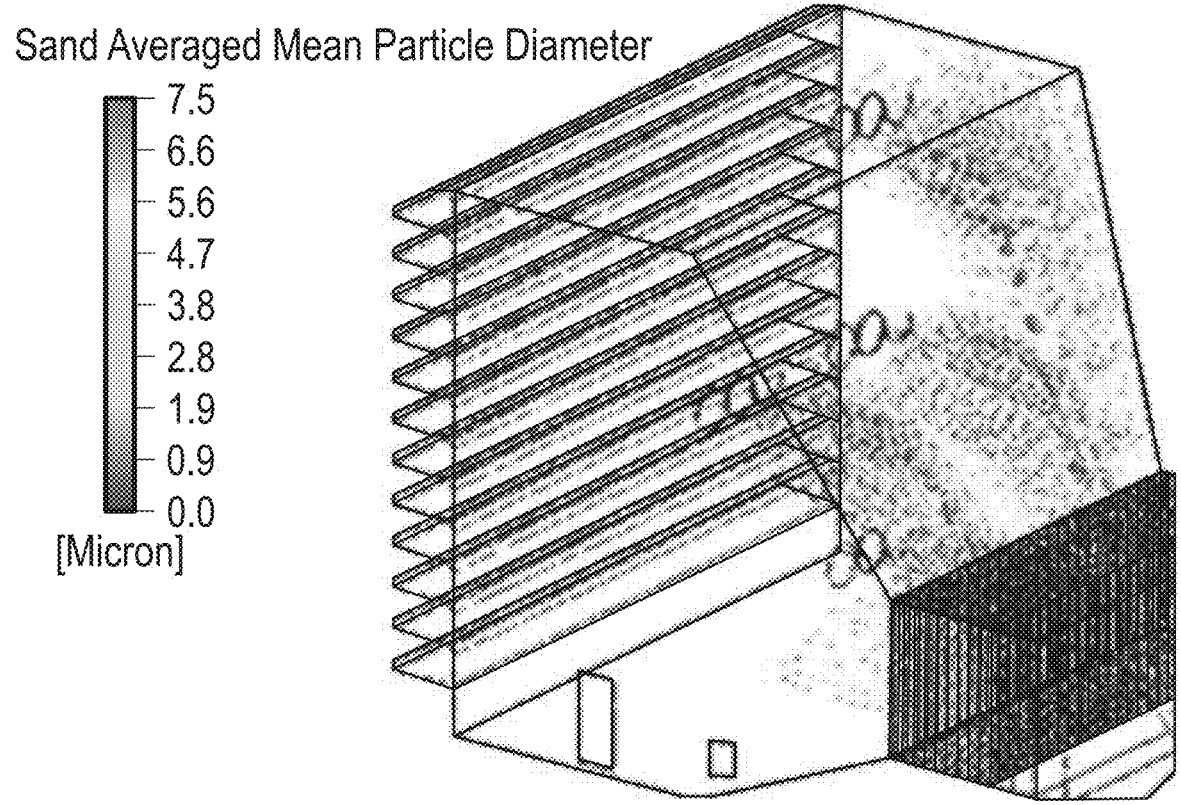
Figure 7C:
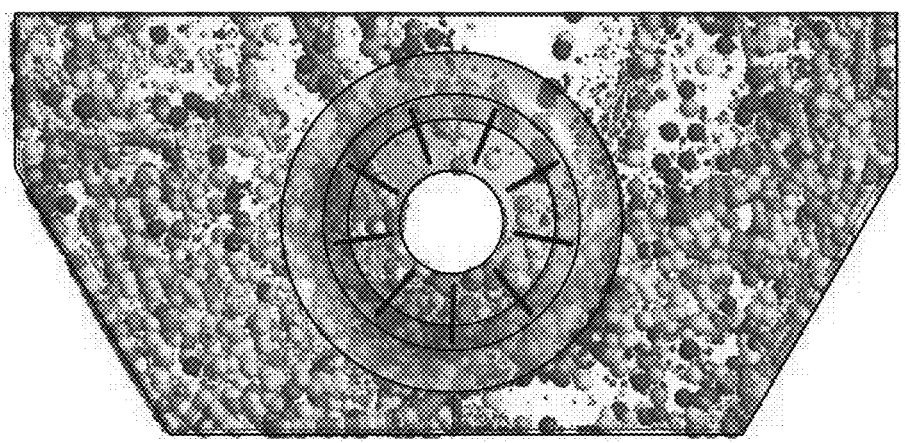
Figure 8B:
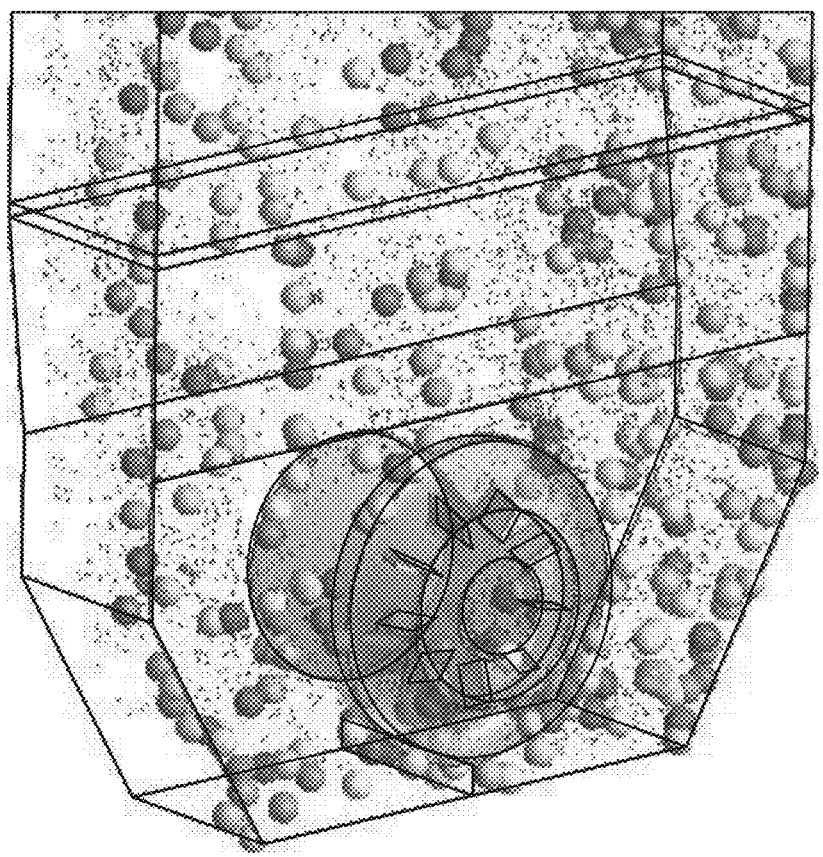
Figure 8C:
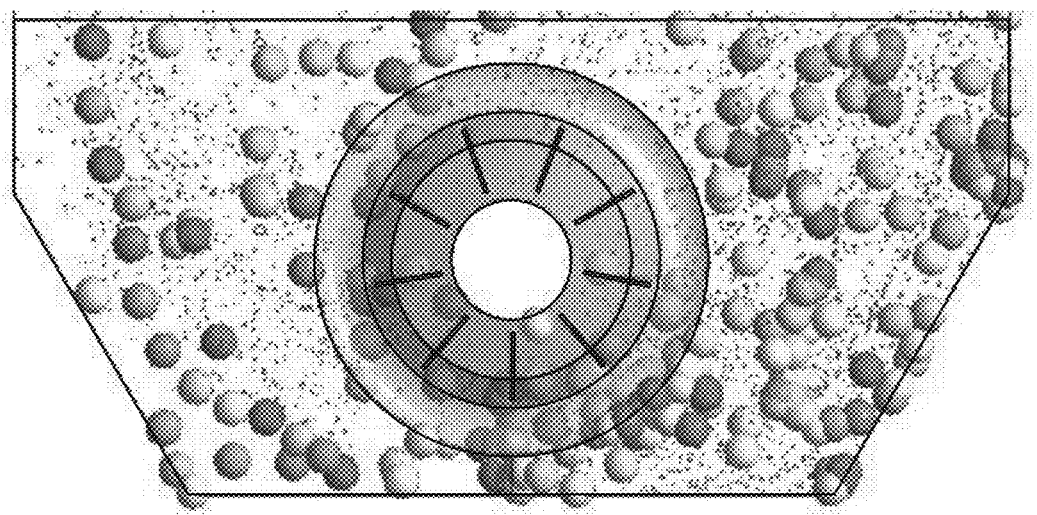
Figure 15:
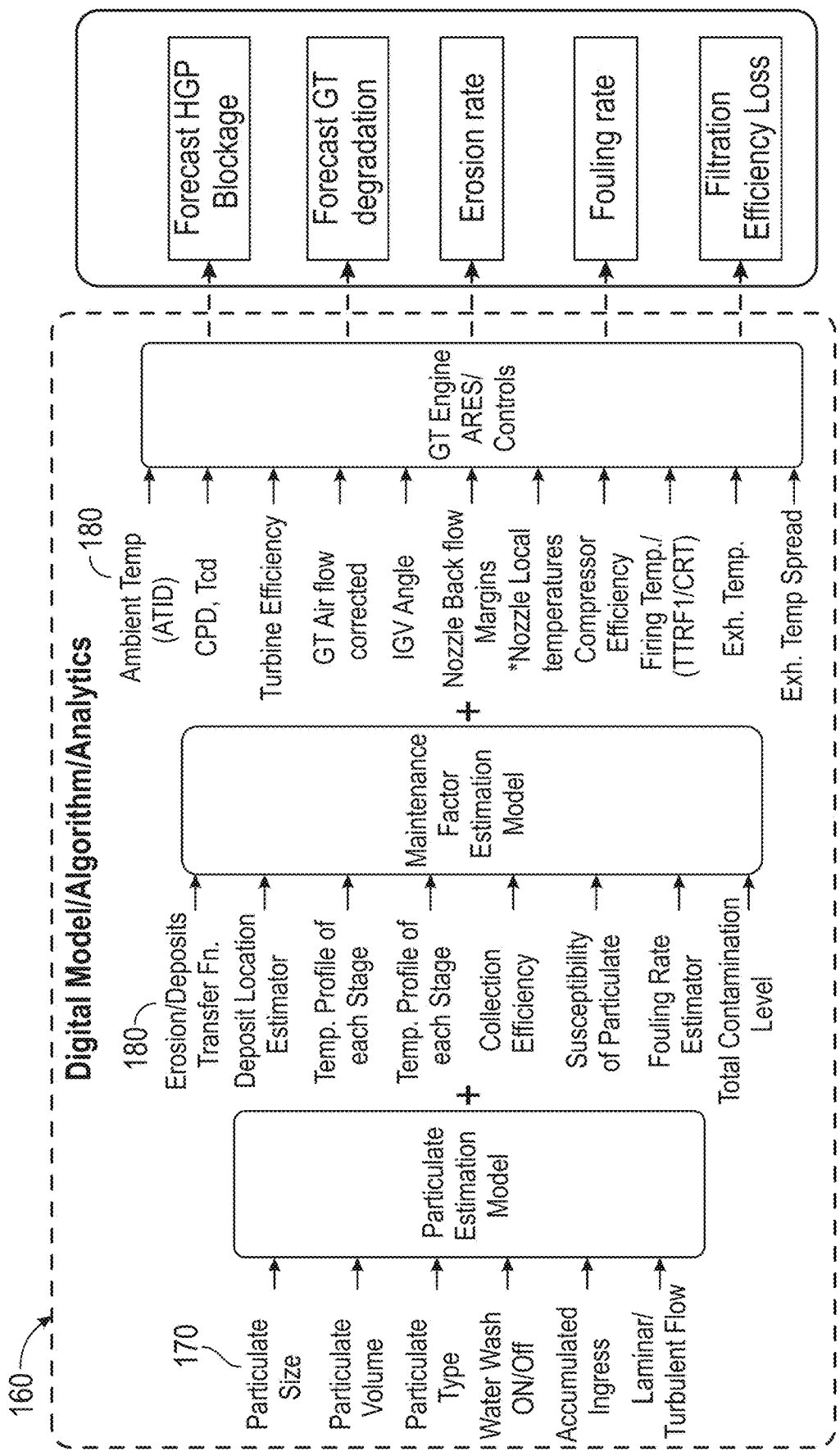
FIG. 15 shows a block diagram of an embodiment of an intelligent model, according to embodiments of the disclosure.

As illustrated in FIG. 2, in some embodiments, the control system 130 integrates an intelligent model 160 of fluid flow within the air filtration assembly 100 based on data 170 measured by the sensor(s) 132. The data 170 measured by the sensor(s) 132 includes, but is not limited to, the volume, distribution, and type of particulate entering the compressor 12. The intelligent model 160 incorporates known data 180 from a database in the form of the structure of the gas turbine system 182, the structure of the various fluid flow paths 184, the location(s) 186 of the sensor(s) 132, other known fluid flow data 188, testing data 190, and/or field observations 192 to create a customized, specifically-tailored analysis of the fluid flowing through a specific air filtration assembly 100 in real time. The intelligent model 160 employs equations and/or algorithms to model particle deposition rates, particle fouling rates, and/or compressor degradation rates, etc. A block diagram of an example of the intelligent model 160 incorporating the measured data 170 and the known data 180 to determine the aforementioned particle deposition rates, particle fouling rates, and/or compressor degradation rates, etc. is depicted in FIG. 15.

In one embodiment, the intelligent model 160 determines a total contaminant level ("TCL") in parts per million by weight, hereafter "ppmw") according to the following equation:

$$TCL = I_f + [I_{air} \times A/F] + [I_w \times W/F] + [I_{stm} \times S/F]$$

where $I_f$ is the contaminant level in the fuel (ppmw), $I_{air}$ is the contaminant level in the air (ppmw), $I_w$ is the contaminant level in the injection water (ppmw), $I_{stm}$ is the contaminant level in the injection steam (ppmw), A/F is the air to fuel ratio for the gas turbine, S/F is the steam to fuel ratio, and W/F is the water to fuel ratio. The particle behavior is captured by the Stokes number St, where:

$$St = \frac{\rho_p d_p^2 U}{18\mu \cdot 2L}$$

$$L = s\sin(\beta_b - \beta_1)$$

Larger particles, with a larger Stokes number St, will show greater deviations from the gas flow path, and will therefore impact more frequently on the pressure side of the blade. As a result, the capture rate E, increases with the Stokes number St according to:

$$E = 0.08855 \cdot St - 0.0055$$

The diffusion of particles in laminar flow within a tube of radius R, can be described by:

$$n/n_o = 1 - 2.56 \cdot \left(\frac{Dx}{R^2 U}\right)^{\frac{2}{3}} + 1.2 \cdot \left(\frac{Dx}{R^2 U}\right) + 0.0177 \left(\frac{Dx}{R^2 U}\right)^{4/3}$$

where n is the number of particles out of an initial $n_0$ particles that is not captured by the tube walls after traveling a distance x along the tube and D is the diffusion coefficient, which depends on the particle size and flow velocity, among other things. Similar equations describe the diffusion for flows in channels with parallel walls.

In embodiments, experimental data 190 for air flow in a tube, indicating that the particle flux I (i.e., the flow of particles per surface area and time) to the tube walls is described by:

$$\frac{I}{N_0} = \frac{D^{\frac{3}{4}} Re_f^{\frac{7}{8}} v^{\frac{1}{4}}}{90 \cdot r_{particle}} = \frac{D^{\frac{3}{4}} U_f^{\frac{7}{8}} v^{-\frac{5}{8}}}{90 \cdot \left(r_{particle}/L^{\frac{7}{8}}\right)}$$

for a constant amount $N_0$ of particles in the air, increasing flow velocity and reducing relative particle size both lead to increased deposition rates. This means, in particular, that the larger the blade dimension L for a given particle size, the higher the deposition rate. Therefore, a larger compressor has a higher particle accumulation for a given particle size distribution than a smaller compressor. The performance of a compressor stage with increased surface roughness, when compared to a smooth stage, encounters significant deterioration (with a surface roughness equivalent to about:

$$k_s/c = 0.714 \times 10^{-3} (k_s = 40\ \mu m).$$

The degradation is determined mainly by the roughness on the suction side. For a typical compressor blade in an industrial gas turbine with a 100 mm chord length, this is equivalent to a surface roughness of 71 μm.

A relationship for fouling exists that combines the geometric and aero-thermal characteristics of the engine compressor 12. It is derived based on considerations of the entrainment efficiency of a cylinder due to inertial deposition corrected to the entrainment efficiency of a row of airfoils due to inertial deposition:

$$ISF = \frac{W c_p \Delta T_{stage}}{(1 - r_h^2) D_c^3} \cdot 10^{-6}.$$

The susceptibility of a given engine to particles of a certain size is:

$$\lambda = ISF \cdot \frac{\rho_p \cdot d_p^2}{\eta_f}.$$

Larger, heavier particles have a higher chance than small particles to collide with the blade surface and the model predicts a higher susceptibility of smaller gas turbines to fouling, with some impact of higher stage loading. Fouling is closely related to the geometric and flow characteristics of the axial compressor stage. Adhesion of particles to blades (defined as the cascade collection efficiency) is increased with a decrease of chard length and an increase of solidity. Furthermore, fouling is increased with reduced flow rates, which are closely related to the incoming air velocities. Large particles increase the cascade collection efficiency. Deposition of large particles in front stages makes fouling dominant in front stages, but small particles pass through the front stages and influence downstream compressor stages. Particle size distribution is an important parameter that influences the extent of the fouling.

The collection efficiency is inversely affected by particle size and flow velocity, i.e., the smaller the particle and the slower the airflow, the higher the deposition rate becomes. For an airfoil of chord length L, the collection efficiency for the diffusion process becomes:

$$\lambda = 3\frac{\left(\frac{8hDR}{3\overline{U}}\right)^{2/3}}{2h^2} = 2.884\frac{\left(\frac{DR}{\overline{U}}\right)^{2/3}}{h^{4/3}}$$

with $\overline{U}$ being the free stream flow velocity, D being the diffusion coefficient, R being the maximum thickness of the blade, and h being the blade to blade distance. Wider spaced blades and higher flow velocity both lower collection efficiency. It must be determined which factors affect the diffusion coefficient D. If the majority of diffusion is turbulent diffusion (which is orders of magnitude larger than laminar diffusion and is driven by turbulent eddies) it can be assumed that the diffusion rate is determined by the turbulence rate in the flow. The fouling index Fl is expressed by:

$$FI = \frac{P_{GT}}{W c_p \Delta T} \approx \frac{P_{GT}}{P_{compr}}.$$

A wide range of gas turbines has been studied to evaluate their sensitivity to an imposed level of fouling. The results indicate that the net work ratio ($NWR/W_t$) is indicative of both the gas turbine's susceptibility to foul and its sensitivity to the effects of fouling. Low net work ratio engines where a higher portion of the total turbine work is represented by:

$$\frac{W'_{out}}{W_{out}} = \frac{W_t - W'_c}{W_t - W_c} = \frac{W_t - \frac{\eta'_c}{\eta_c} W'_c}{W_t - W_c} = \frac{\frac{W_{out}}{NWR} - \frac{\eta_c}{\eta'_c} W_{out}\left(\frac{1}{NWR} - 1\right)}{W_{out}} = \frac{1}{NWR} - \frac{\eta_c}{\eta'_c}\left(\frac{1}{NWR} - 1\right).$$

The intelligent model 160 uses the particle size and fluid flow velocity at specific locations 186 in the fluid flow path to estimate likely locations of particle impact within the assembly and any resulting damage and/or deposition. Based on the known data 180 in a database of the structure of the gas turbine system 182, the structure of the fluid flow paths 184, the location(s) 186 of the sensor(s) 132, other known fluid flow data 188, testing data 190, and/or field observations 192 the intelligent model 160 uses the detected data 170 of particle size, velocity, and distribution to predict the susceptibility of turbines 28 to fouling.

The intelligent model 160 built by the control system 130 may interpret the detected data 170 provided by the sensor(s) 132 to generate an estimate of accumulated ingress of particulates entering the compressor 12. Control system 130 may then determine if the detected amount and/or concentration of particles 112 exceeds a predetermined threshold of particles. The predetermined threshold of particles may be based on a predetermined or predefined maximum of particles that may be found within intake air 104 before damage to compressor 12 will occur and/or a decrease in operational efficiency of gas turbine system 10 is eminent. The intelligent model 160 allows the operator to check and/or validate the integrity of the compressor inlet filtration system 100. The intelligent model 160 provides for a comprehensive and real-time estimation of the possible inlet system breach, amount of ingress, fouling, erosion, and corrosion along with associated performance degradation rates. The model 160 reduces the foreign object debris ingress related events up to and including catastrophes of the gas turbine 28, reduces the maintenance cost of gas turbine components, and may be integrated into an overall heavy duty gas turbine health monitoring system incorporated into other digital control platforms. Moreover, the model 160 utilizes a sensor based system that identifies abnormal activity at the compressor inlet with the sensor(s) 132 and flags any signature that indicates unacceptable inlet system leaks and/or ingress of foreign particles.

As illustrated in FIGS. 3 and 4A-5D, in some embodiments, sensors 132A, 132B, 132C, 132D are placed at inlet detection locations 186A, 186B, 186C, 186D around the bellmouth of the compressor 12 within the air filtration assembly 100 and at least one sensor 132E is placed at exhaust detection location 186E within the exhaust frame 34 of the gas turbine system 10. During a normal operational state, as depicted for example in FIGS. 6A-6C, the sensors 132A-132D at locations 186A-186D measure the data 170 of particulates having a size that is below the filter efficiency without any leaks in the duct joints, the vane filters 118, and the fabric filters 120. In the embodiment depicted in FIGS. 6A-6C, particles are injected from the inlet 106 (i.e., the weather hood) at a rate of 525.8 grams/hour. Testing revealed that 2.52 grams/hour (approximately 0.5% of the injected mass) were deposited on the inner surface of the assembly (specifically on the horizontal duct and plenum floors) in this normal operational state. During a failure operational state, as depicted for example in FIGS. 7A-8C, the sensors 132A-132D at locations 186A-186D measure the data 170 of particulates having a size and/or concentration within the fluid that is above the filter efficiency of the vane filters 118 and fabric filters 120. In the embodiment depicted in FIGS. 7A-7C, there is a leak present in the assembly causing the particulates to bypass the vane filters 118 and/or fabric filters 120. In this embodiment, testing revealed that the particles injected from the leaks amounted to 113.2 grams/hour and resulted in 3.52 grams/hour (approximately 3.1% of the injected mass) of the particles deposited on the inner surface of the assembly. In the embodiment depicted in FIGS. 8A-8C, there is a leak present in the assembly and the assembly is located in a common operating environment that is rich in particulates such as sand. In this embodiment, testing revealed that the particles injected from the leaks amounted to 3,569.1 grams/hour and resulted in 436.5 grams/hour (approximately 12.2% of the injected mass) of the particles deposited on the inner surface of the assembly. In the embodiments depicted in FIGS. 6A-8C, the particle distribution at different planes shows that the particles collide with the inlet casing surfaces and may end up sticking to the casing surfaces. There was no correlation between the velocity magnitude of the particles and the sand particle concentrations. The testing data 190 presented in FIGS. 6A-8C is outlined in detail in the table depicted in FIGS. 9 and 9 is confirmed by computational fluid dynamic ("CFD") calculations (depicted in detail in FIGS. 14A and 14B) and other field observations of particle accumulation at the inlet detection locations 186A-186D. Larger particle dimensions are typically expected outside the air filtration assembly 100 or when a joint/flange leak exists in the air filtration assembly 100. In situations such as this leak, the outside particles will not be filtered down and hence the engine is exposed to the particulates that exist in normal ambient air outside.

Figure 10:
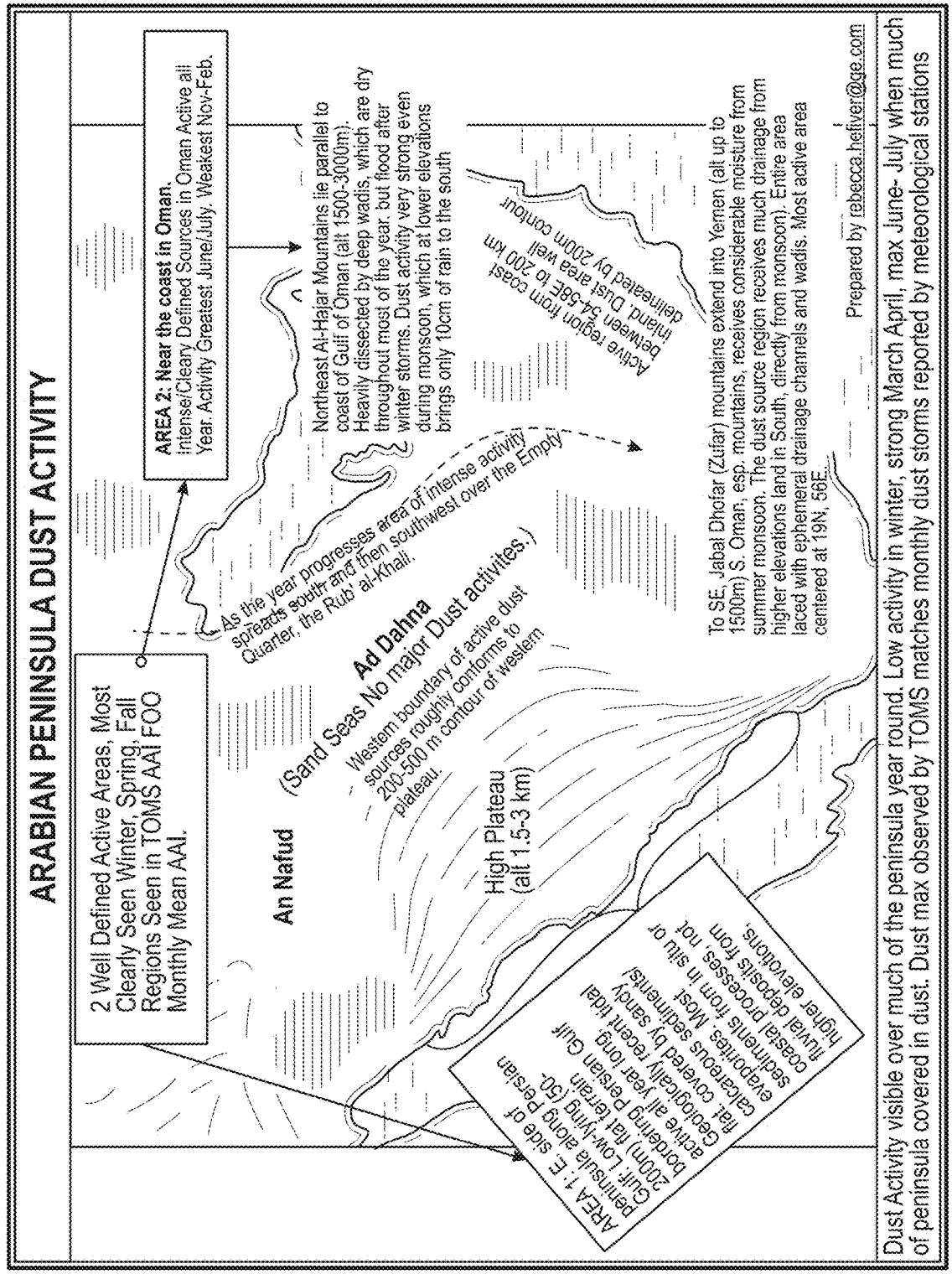
FIG. 10 shows a map of an example of common operating environments discussed herein, according to embodiments of the disclosure.
Figure 11:
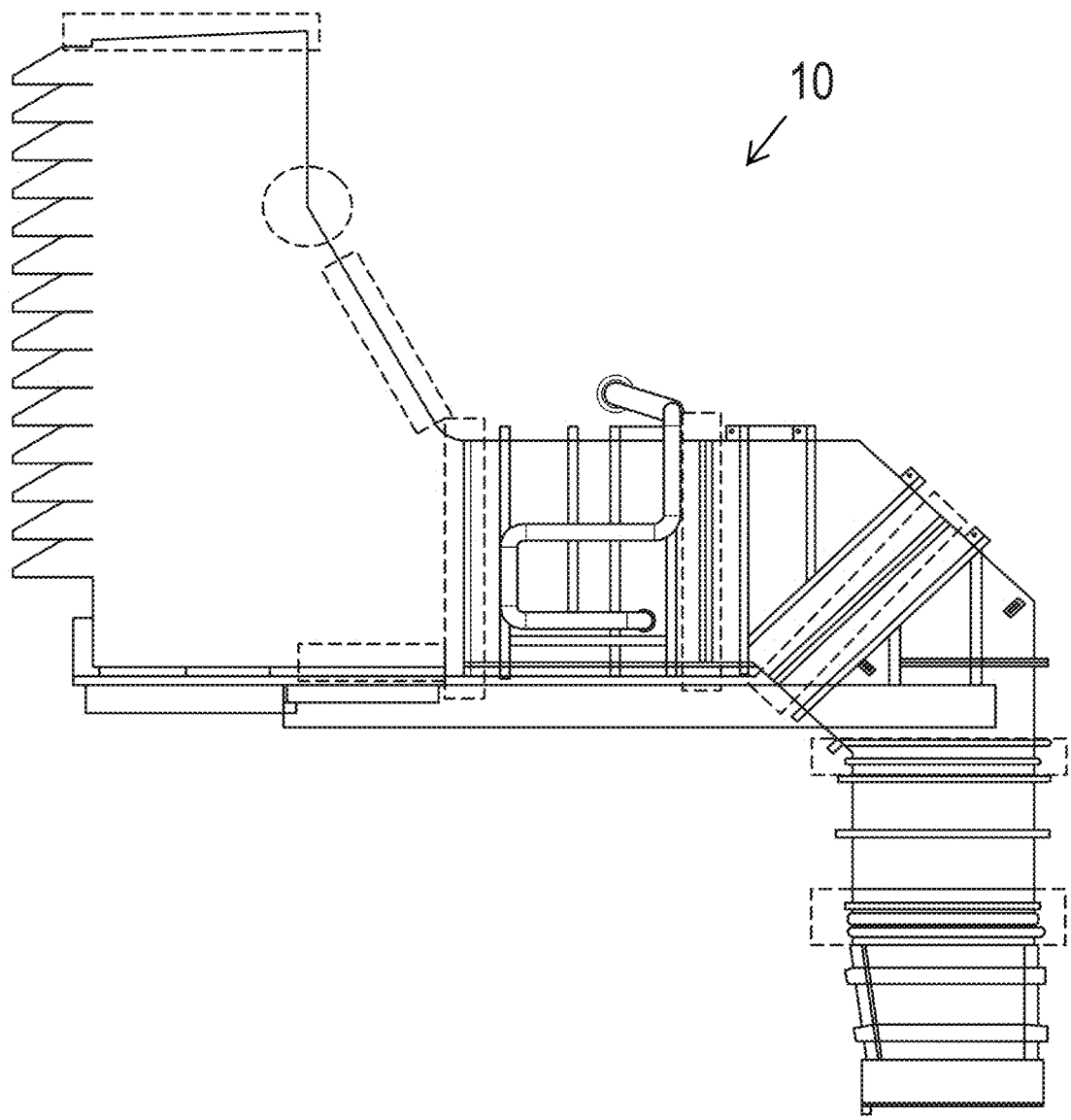
FIG. 11 depicts the failure points of the turbine systems of FIGS. 6A-8C, according to embodiments of the disclosure.
Figure 12:
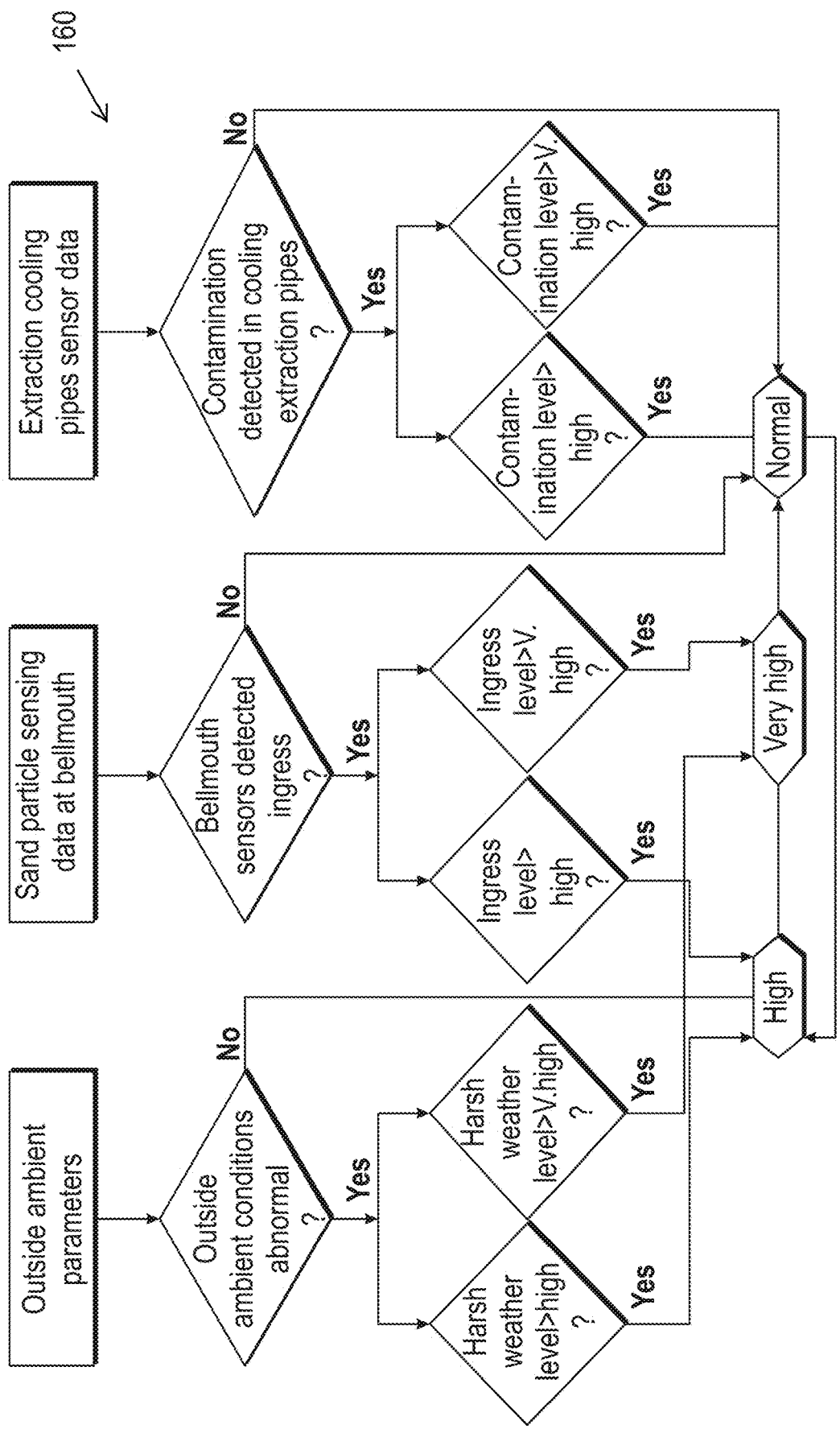
FIG. 12 depicts a flow chart of the control system of the turbine systems 6A-8C, according to embodiments of the disclosure.

The intelligent model 160 incorporates the measured data 170 of the particulates detected by the sensors 132A-132D at the inlet detection locations 186A-186D and the exhaust detection location 186E with known data 180 in the form of the structure of the gas turbine system 182, the structure of the various fluid flow paths 184, the location(s) of the sensor(s) 132A-132E, other known fluid flow data 188, testing data 190, and/or field observations 192 to identify a likely location of failure within the air filtration assembly 100. The known fluid flow data 188 incorporated into the analysis of the intelligent model 160 accounts for specific details of the operating environment of the air filtration assembly 100, including hot and harsh common operating environments (e.g., operating environments with severe air quality contamination challenges such as in arid regions with sandstorms, close to a marine coastline, etc.). FIG. 10 shows an annotated graphical representation of hot and harsh common operating environments, based on a Total Ozone Mapping System ("TOMS") of the flight operating office ("FOO") or monthly means provided by the Airport Authority of India ("AAI"). The intelligent model 160 identifies and calculates particle presence and particle velocity distributions to estimate particle accumulation at various locations of the fluid flow path within the air filtration assembly 100, the compressor 12, the turbine 28 and the exhaust frame 34. This allows the control system 130 and/or the turbine control system 36 to determine the appropriate course of action, including but not limited to, adjusting operating parameters of the combustor 22, the turbine 28, and/or the electrostatic component 24, notifying an operator of the likely location of a fault in the assembly to provide recommendations for inspection, and/or initiating a shut down of the combustor 22 and/or turbine 28 to prevent significant damage to engine parts up to and including catastrophic failure. The intelligent model 160 incorporates known data 180 in the form of testing data 190 and field observations 192 to provide accurate estimations of particle accumulation at various locations of the fluid flow path within the air filtration assembly 100. The points of failure for the gas turbine systems of FIGS. 6A-8C are depicted in FIG. 11. FIG. 12 provides a flow chart of one example of the control system 130 utilizing the intelligent model 160 to identify risk of damage to the gas turbine systems of FIGS. 6A-8C.

In some embodiments (not depicted), a filter testing assembly of a gas turbine system 10 is converted into a particle ingress testing assembly of a gas turbine system 10, as discussed herein, flow by repurposing at least one component of the filter testing assembly into at least one system/structure carrying a sensor 132 to send measured data 170 to the intelligent model 160.

In some embodiments, the intelligent model 160 analyzes known data in the form of the structure of the gas turbine system 182 and the structure of the various fluid flow paths 184, the other known fluid flow data 188 including the operating environment, testing data 190, and/or field observations 192 to recommend the inlet detection locations 186A-186D and/or the exhaust detection location(s) 186E to provide accurate measurement and prediction of particle accumulation at various locations of the fluid flow path within the air filtration assembly 100 for a specific air filtration assembly 100 in a specific operating environment. This recommendation of data acquisition locations 186A-186E within the air filtration assembly 100 provides further customization and specifically-tailored analysis of the fluid flowing through the specific air filtration assembly 100 in real time. The recommended data acquisition locations 186A-186E may be integrated into the intelligent model 160 for future air filtration assemblies 100 having similar structures and/or being present in similar operating environments and the intelligent model 160 may further refine the recommended data acquisition locations 186A-186E based on specifics of the known data 180 as set forth herein.

As illustrated in FIG. 2, in some embodiments, the intelligent model 160 also incorporates known data 180 in the form of hot gas path operating conditions and design parameters 194, including but not limited to firing temperature, cooling hole dimensions, blockage probability and estimation of the risk of hot corrosion, and/or cooling hole blockage or spallation within the exhaust frame 34 to further assess the impact of the particulate(s) on performance, maintenance factor and/or the risk of forced outage. Hot gas path cooling hole blockage analysis by the intelligent model 160 checks the particulate composition, size, and distribution to correlated with the temperature of the fluid and cooling hole dimensions for possible glass formation and/or blockage of the cooling holes. The intelligent model 160 verifies the contaminants composition and the temperature within the hot gas path and provides an alarm to the operator if the intelligent model 160 estimated material spallation through the data 170 measured at the inlet detection locations 186A-186D and/or the exhaust detection location(s) 186E. This allows the control system 130 and/or the turbine control system 36 to adjust and in some cases avoid major hot gas path events and prevent forced outages. The intelligent model 160 may advise the operator of financial and/or cyclical time impacts based on the estimated material spallation within the hot gas path.

Figure 13A:
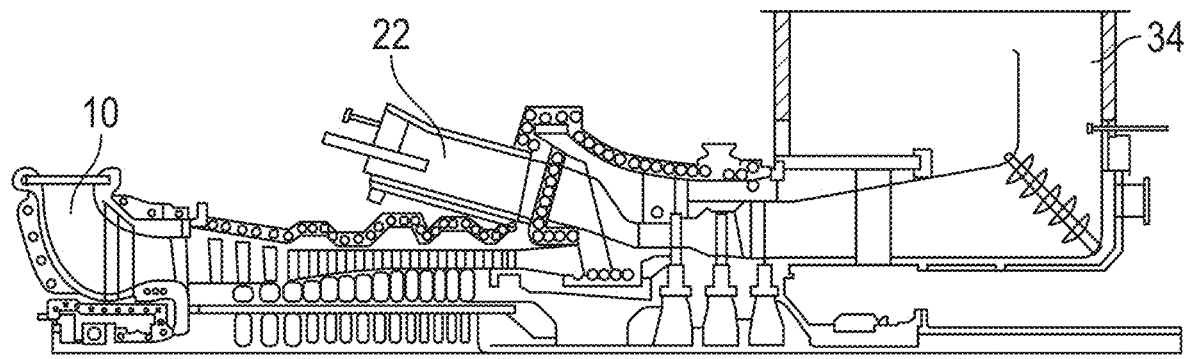
FIGS. 13A and 13B show a side view and a perspective view of a turbine system and an air filtration assembly including extraction cooling pipes, according to embodiments of the disclosure.
Figure 13B:
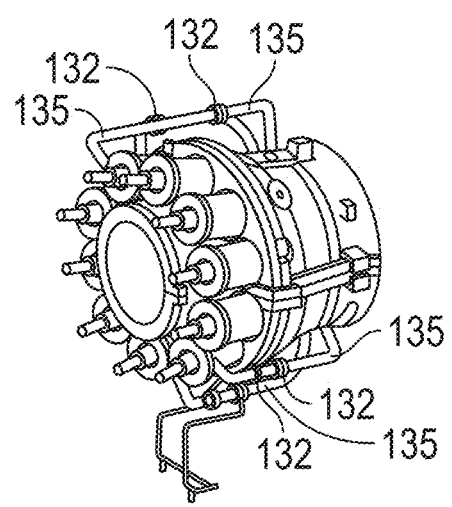
Figure 14A:
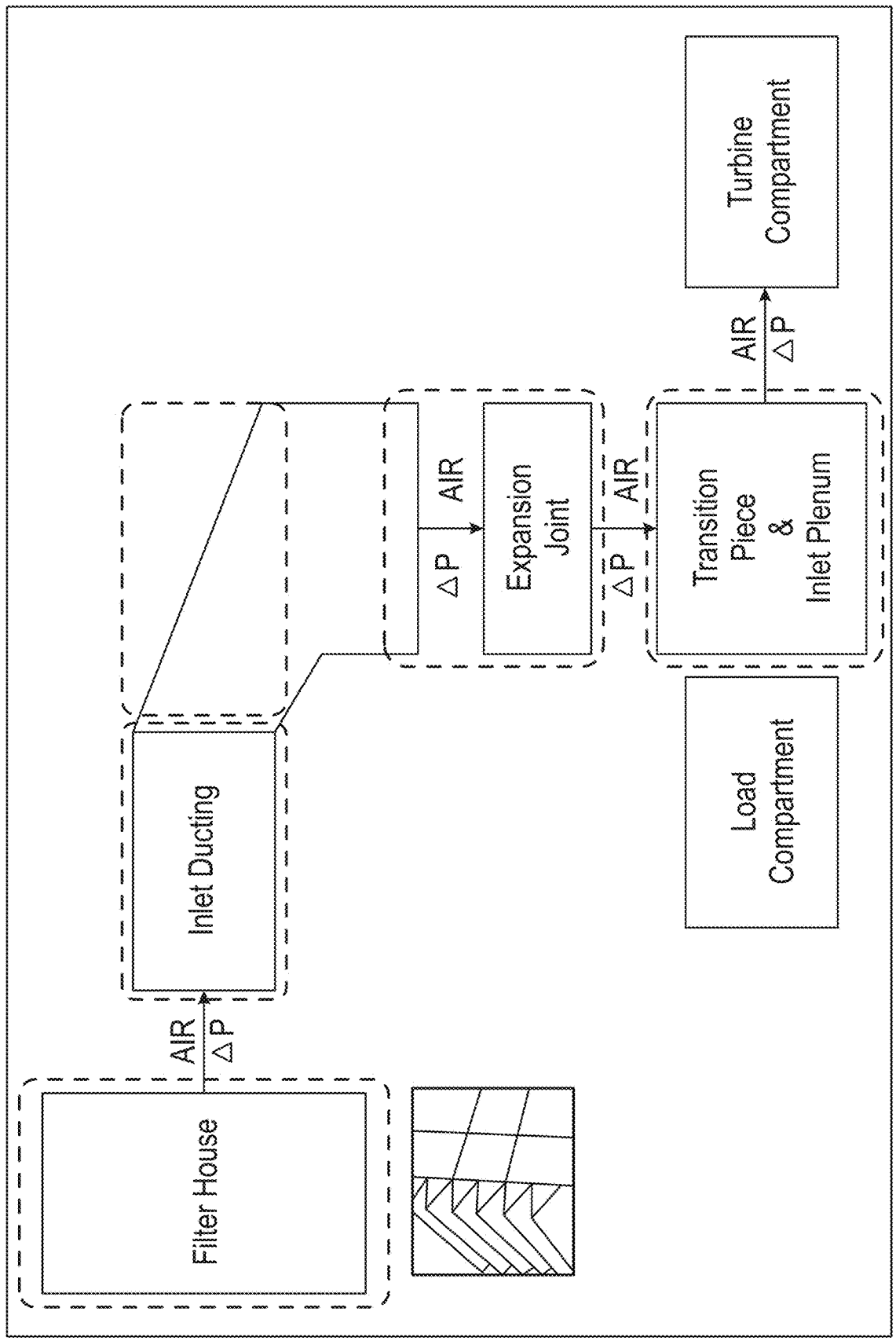

As illustrated in FIGS. 13A and 13B, in some embodiments, sensors 132 are placed around cooling pipes 135 instead of around the bellmouth of compressor 12. This allows the intelligent model 160 to identify contaminants before significant deposition in the hot section of the turbine 28. The location of the sensors 132 allows different types of sensors to be used, including but not limited to electrostatic sensors, infrared sensors, acoustic wave sensors, optical sensors, laser sensors, etc. The number of sensors 132 may change depending on the criticality of the design and/or based on geographic conditions. This embodiment provides a key benefit as hot gas part damage is an area of high commercial value to replace and/or repair. It also provides a method of shortening the development and testing cycle of turbine particle ingress detection sensors. In some embodiments, sensors 132 placed around the cooling pipes 135 act as an additional source of particle detection and as an error check for sensors 132 upstream of the hot section to validate the sensor system at full scale.

Although discussed herein as being formed in air inlet duct 102, it is understood that at least a portion of the components of air filtration assembly 100 discussed herein with respect to FIGS. 1-15 may be positioned within and/or directly downstream of distinct portions and/or components of gas turbine system 10. For example, at least a portion of air filtration assembly 100 may be positioned within combustor 22 and/or downstream compressor 12 to filter particles 112 from the fluid (e.g., air) utilized by combustor 22, as discussed herein.

Technical effects of the disclosure include providing sensing systems and methods configured to utilize an intelligent model of particulate presence and accumulation within turbine systems to address engine maintenance, erosion, corrosion, and parts failure mitigation.

Finally, the system 10 may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein, which may be in real-time. For example, the system 10 may include at least one processor and system memory/data storage structures, which may include random access memory (RAM) and read-only memory (ROM). The at least one processor of the system 10 may include one or more conventional microprocessors and one or more supplementary co-processors such as math co-processors or the like. The data storage structures discussed herein may include an appropriate combination of magnetic, optical and/or semiconductor memory, and may include, for example, RAM, ROM, flash drive, an optical disc such as a compact disc and/or a hard disk or drive.

Additionally, a software application that adapts the control system to perform the methods disclosed herein may be read into a main memory of the at least one processor from a computer-readable medium. The term "computer-readable medium", as used herein, refers to any medium that provides or participates in providing instructions to the at least one processor of the system 10 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random-access memory (DRAM), which typically constitutes the main memory. Common forms of computer-readable media include, for example, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

Further aspects of the invention are provided by the subject matter of the following clauses:

1. A method of determining a location to place a sensor in a fluid flow path of a turbine system, the method comprising consulting an intelligent model of fluid flow tailored to the turbine system and based on a database of known data values; determining at least one location within the fluid flow path that will allow measurement of an accurate data value of an air intake particle; placing a sensor at the at least one location within the fluid flow path; and measuring at least one measured data value of the air intake particle at least one location of the sensor, wherein the database of known data values includes at least one of a structure of the turbine system, a structure of the fluid flow path, the location of the sensor, other known fluid flow data, testing data, and field observations, and wherein the at least one location within the fluid flow path minimizes the likelihood of accumulation of air intake particles on the sensor.

The method of clause 1, further comprising the step of updating the intelligent model based on measured data values after the step of measuring the at least one measured data value of the air intake particle.

2. The method of clause 1, further comprising the step of receiving at least one of an estimation of possible breach of an air inlet system of the turbine system, amount of ingress of air intake particles into the turbine system, fouling within the turbine system, erosion of at least a portion of the turbine system, and performance degradation rate of the turbine system after the step of measuring at least one measured data value of the air intake particle.

3. The method of clause 1, further comprising determining at least one additional location within the fluid flow path; placing at least one additional sensor at the at least one additional location; and measuring an additional at least one measured data value of the air intake particle at the at least one additional location of the sensor.

4. The method of clause 4, further comprising the step of receiving at least one of an estimation of possible breach of an air inlet system of the turbine system, amount of ingress of air intake particles into the turbine system, fouling within the turbine system, erosion of at least a portion of the turbine system, and performance degradation rate of the turbine system after the step of measuring at least one measured data value of the air intake particle, wherein the intelligent system interprets the additional at least one measured data value to error check the at least one measured data value to reduce false positives in the at least one estimation of possible breach of the air inlet system of the turbine system, amount of ingress of air intake particles into the turbine system, fouling within the turbine system, erosion of at least a portion of the turbine system, and performance degradation rate of the turbine system.

5. The method of clause 4, further comprising the step of converting a filter testing assembly of a turbine system into a particle ingress testing assembly of a turbine system before the step of consulting the intelligent model of fluid flow by repurposing at least one sensor of the filter testing assembly into the at least one sensor.

6. The method of clause 1, wherein the sensor includes at least one of an electrostatic sensor, infrared sensor, acoustic wave sensor, optical sensor, and laser sensor.

7. A control system for a turbine system, the control system comprising: an intelligent model including: at least one measured data value received from at least one sensor, the sensor positioned within a fluid flow path of the turbine system within an air inlet system of the turbine system; and a database of known data including at least one of a structure of the turbine system, a structure of fluid flow paths in the turbine system, a location of the sensor, other known fluid flow data, testing data, and field observations, wherein the control system consults the intelligent model to provide at least one of an estimation of possible breach of the air inlet system, amount of ingress of air intake particles into the turbine system, fouling within the turbine system, erosion of at least a portion of the turbine system, and performance degradation rate of the turbine system.

8. The control system of clause 8, wherein the at least one sensor is located within a cooling pipe of a compressor of the turbine system to detect at least one measured data value of particles within the cooling pipe.

9. The air filtration assembly of claim 8, further comprising two or more sensors operably coupled to the control system, each of the two or more sensors positioned within the fluid flow path of the turbine system and configured to detect at least one measured data value of the air intake particles, wherein the control system captures each of the at least one measured data value of the air intake particles and processes each of the at least one measured data values with the intelligent model to provide the at least one estimation of possible breach of the air inlet system, amount of ingress of air intake particles into the turbine system, fouling within the turbine system, erosion of at least a portion of the turbine system, and performance degradation rate of the turbine system.

10. The control system of clause 10, wherein one of the sensors is located within a cooling pipe of a compressor of the turbine system to detect at least one measured data value of particles within the cooling pipe, and wherein the intelligent system uses the at least one measured data value of the particles within the cooling pipes to provide an error check on the at least one estimation of the possible breach of the air inlet system, amount of ingress of air intake particles into the turbine system, fouling within the turbine system, erosion of at least a portion of the turbine system, and performance degradation rate of the turbine system.

11. The control system of clause 8, wherein the at least one measured data value of the air intake particles includes at least one of the volume of particles, the distribution of particles, the type of particles, and the velocity of the particles.

12. The control system of clause 8, wherein the control system further comprises at least one of alerting an operator of the air filtration assembly, adjusting an operating parameter of the turbine system, and shutting down the turbine system based on the intelligent model of fluid flow if the at least one estimate exceeds a desired threshold.

13. The control system of clause 8, wherein the intelligent model of fluid flow updates in real time.

14. The control system of clause 9, wherein at least one of the sensors is positioned in a bellmouth surrounding a compressor of the turbine system.

15. The control system of clause 9, wherein at least one of the sensors is positioned downstream of an outlet of the air inlet duct.

16. The control system of clause 10, wherein at least four sensors are positioned at distinct inlet detection locations around a bellmouth of a compressor of the turbine system, and wherein at least one sensor is positioned at an outlet detection location within an exhaust flow path downstream of a turbine of the turbine system.

17. The control system of clause 8, wherein the intelligent model is integrated into a filter testing assembly of a turbine system to create a particle ingress testing assembly of a turbine system by repurposing at least one sensor of the filter testing assembly into the at least one sensor.

18. A control system for a turbine system, the control system comprising an intelligent model including: at least one measured data value received from at least one sensor, the sensor positioned within a fluid flow path of the turbine system; and a database of known data including at least one of a structure of the turbine system, a structure of fluid flow paths in the turbine system, a location of the sensor, other known fluid flow data, testing data, and field observations, wherein the control system consults the intelligent model to provide at least one of an estimation of possible breach of the air inlet system, amount of ingress of air intake particles into the turbine system, fouling within the turbine system, erosion of at least a portion of the turbine system, and performance degradation rate of the turbine system, and wherein the control system generates a signal to control an operating parameter of at least one of a combustor of the turbine system and a turbine of the turbine system.

19. The control system of clause 19, wherein the database of known data values includes hot gas path operating conditions and design parameters including at least one of firing temperature, cooling hole dimensions, blockage probability, and estimation of the risk of hot corrosion, cooling hole blockage, or spallation within the turbine system.

20. The control system of clause 19, further comprising cooling pipes extending away from the compressor, wherein the at least one sensor is located adjacent to the cooling pipes and the intelligent model of fluid flow identifies contaminants in the air intake particles before significant deposition in the turbine system.

21. The control system of clause 19, wherein the sensors include at least one of an electrostatic sensor, infrared sensor, acoustic wave sensor, optical sensor, and laser sensor.

22. The control system of clause 19, wherein at least one sensor is positioned downstream of a filtration assembly of the turbine system and at least one sensor is positioned within a cooling pipe of the turbine system, and wherein the intelligent model uses at least one of the measured data value received from the at least one sensor positioned downstream of a filtration assembly of the turbine system and the measured data value received from the at least one sensor positioned within the cooling pipe of the turbine system to improve reliability of the detection of particle ingress into the turbine system.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A turbine system comprising:
   a turbine including a compressor;
   an air inlet system to intake air for supply to the turbine and comprising one or more stages of filters;
   a fluid flow path in fluid communication with the turbine and the air inlet system;
   an electrostatic component downstream of the one or more stages of filters and including a matrix of ionizers in the fluid flow path upstream of the compressor to charge particles in the intake air flowing through the air inlet system to the turbine;
   at least one sensor to detect charged particles in the fluid flow path and generate information associated with the charged particles; and
   a control system to control operation of the turbine and the electrostatic component as a function of the charged particles detected in the fluid flow path, the control system having a turbine system particulate presence and accumulation model, wherein the control system is configured to apply the information associated with the detected charged particles to the turbine system particulate presence and accumulation model to obtain an analysis of particle accumulation in the fluid flow path and effects that the particle accumulation has on the operation and/or efficiency of the turbine and the air inlet system, and wherein the control system is configured to adjust the operation of the turbine and the electrostatic component based on the analysis.

2. The turbine system of claim 1, wherein the at least one sensor is located within a cooling pipe of the compressor to detect at least one measured data value of the charged particles within the cooling pipe.

3. The turbine system of claim 2, wherein the at least one sensor is positioned downstream of an outlet of the air inlet system.

4. The turbine system of claim 1, wherein the at least one sensor comprises further comprising two or more sensors, each of the two or more sensors positioned within the fluid flow path and configured to detect at least one measured data value of the charged particles,
   wherein the control system is configured to capture each of the at least one measured data value of the charged particles and process each of the at least one measured data values with the turbine system particulate presence and accumulation model to provide the analysis.

5. The turbine system of claim 4, wherein one of the two or more sensors is located within a cooling pipe of the compressor to detect at least one measured data value of the charged particles within the cooling pipe, and
   wherein the turbine system particulate presence and accumulation model uses the at least one measured data value of the charged particles within the cooling pipe to provide an error check on the analysis.

6. The turbine system of claim 4, wherein the at least one sensor comprises at least four sensors positioned at distinct inlet detection locations around a bellmouth of the compressor of the turbine, and
   wherein the at least one sensor includes one or more sensors positioned at an outlet detection location within an exhaust flow path downstream of the turbine.

7. The turbine system of claim 1, wherein the information generated from the at least one sensor includes one or more of the volume of the charged particles, the distribution of the charged particles, the type of charged particles, and the velocity of the charged particles.

8. The turbine system of claim 1, wherein the control system is further configured to perform one or more of alerting an operator of the air inlet system and the turbine, adjusting an operating parameter of the turbine system, and shutting down the turbine and the air inlet system based on the analysis obtained from the turbine system particulate presence and accumulation model that is indicative of at least one estimate exceeding a desired threshold.

9. The turbine system of claim 1, wherein the turbine system particulate presence and accumulation model updates in real time.

10. The turbine system of claim 1, wherein at least one of the at least one sensors is positioned in a bellmouth surrounding the compressor of the turbine.

11. The turbine system of claim 1, wherein the analysis provides one or more of an estimation of a possible breach of the air inlet system, an amount of ingress of charge particles into the turbine and the air inlet system, fouling within the turbine and the air inlet system, erosion of at least a portion of the turbine and the air inlet system, and performance degradation rate of the turbine and the air inlet system.

12. The turbine system of claim 1, wherein the turbine system particulate presence and accumulation model comprises a database of known data including one or more of a structure of the turbine and the air inlet system, a structure of the fluid flow path, a location of the at least one sensor, other known fluid flow data, testing data, and field observations.

13. A gas turbine system comprising:
a gas turbine engine including a compressor, a combustor and a turbine;
an air inlet system to intake air for supply to the gas turbine engine, the air inlet system including an air filtration assembly comprising one or more stages of filters;
a fluid flow path in fluid communication with the gas turbine engine and the air inlet system;
an electrostatic component including a matrix of ionizers in the air filtration assembly and downstream of one or more stages of filters to charge particles in the intake air flowing through the air inlet system to the gas turbine engine via the fluid flow path;
at least one particle detection sensor to detect charged particles in the fluid flow path and generate information associated with the charged particles; and
a control system to control operation of the gas turbine system as a function of the charged particles detected in the fluid flow path, the control system having a turbine system particulate presence and accumulation model, wherein the control system is configured to apply the information associated with the detected charged particles to the turbine system particulate presence and accumulation model to obtain an analysis of particle accumulation in the fluid flow path and effects that the particle accumulation has on the operation and/or efficiency of the gas turbine system, and wherein the control system is configured to adjust the operation of the gas turbine system based on the analysis.

14. The gas turbine system of claim 13, further comprising cooling pipes extending away from the compressor, wherein the at least one particle detection sensor is located adjacent to the cooling pipes and the turbine system particulate presence and accumulation model identifies contaminants in the intake air before significant deposition in the gas turbine system.

15. The gas turbine system of claim 13, wherein the at least one particle detection sensor includes one or more of an electrostatic sensor, an infrared sensor, an acoustic wave sensor, an optical sensor, and a laser sensor.

16. The gas turbine system of claim 13, wherein the at least one particle detection sensor includes at least one particle detection sensor positioned downstream of the air filtration assembly and at least one particle detection sensor positioned within a cooling pipe of the gas turbine system, and
wherein the turbine system particulate presence and accumulation model uses at least one of the measured data value received from the at least one particle detection sensor positioned downstream of the air filtration assembly and a measured data value received from the at least one particle detection sensor positioned within the cooling pipe to improve reliability of the detection of particle ingress into the gas turbine system.

17. The gas turbine system of claim 13, wherein the analysis provides one or more of an estimation of a possible breach of the air inlet system, an amount of ingress of charged particles into the gas turbine system, fouling within the gas turbine system, erosion of at least a portion of the gas turbine system, and performance degradation rate of the gas turbine system.

18. The gas turbine system of claim 13, wherein the turbine system particulate presence and accumulation model comprises a database of known data including one or more of a structure of the gas turbine system, a structure of the fluid flow path in the gas turbine system, a location of the at least one particle detection sensor, other known fluid flow data, testing data, and field observations.

19. The gas turbine system of claim 18, wherein the database of known data includes hot gas path operating conditions and design parameters including one or more of firing temperature, cooling hole dimensions, blockage probability, and estimation of the of hot corrosion, cooling hole blockage, and spallation within the gas turbine system.

20. The gas turbine system of claim 13, wherein the control system is configured to generate a signal to control an operating parameter of one or more of the combustor and the turbine.

21. The gas turbine system of claim 13, wherein the analysis determines diffusion of the charged particles in the fluid flow path.

22. The gas turbine system of claim 13, wherein the analysis estimates likely locations of impact of the charged particles on components in the gas turbine system and resulting damage and/or deposition.

23. The gas turbine system of claim 13, wherein the control system is configured to ascertain from the analysis whether an amount and/or concentration of charged particles exceeds a predetermined maximum threshold of particles that is permitted in the intake air before damage to the gas turbine engine occurs and/or a decrease in the efficiency of the gas turbine system.

* * * * *